US010809900B2

(12) United States Patent
Aube et al.

(10) Patent No.: US 10,809,900 B2
(45) Date of Patent: Oct. 20, 2020

(54) DETECTION OF POINTING OBJECT AND ACTIVITY OBJECT

(71) Applicant: Tangible Play, Inc., Palo Alto, CA (US)

(72) Inventors: Tony Aube, Palo Alto, CA (US); Jon Dukerschein, Pacifica, CA (US); Jerome Scholler, San Francisco, CA (US); Mark Solomon, Palo Alto, CA (US); Vivardhan Kanoria, Berkeley, CA (US)

(73) Assignee: Tangible Play, Inc., Palo Alto, CA (US)

( * ) Notice: Subject to any disclaimer, the term of this patent is extended or adjusted under 35 U.S.C. 154(b) by 0 days.

(21) Appl. No.: 16/230,404

(22) Filed: Dec. 21, 2018

(65) Prior Publication Data

US 2019/0196609 A1 Jun. 27, 2019

Related U.S. Application Data

(60) Provisional application No. 62/609,089, filed on Dec. 21, 2017.

(51) Int. Cl.
*G06F 3/0354* (2013.01)
*G06F 3/0484* (2013.01)
*G06F 3/042* (2006.01)
*G06F 9/451* (2018.01)
*G06F 1/16* (2006.01)

(52) U.S. Cl.
CPC ........ *G06F 3/04845* (2013.01); *G06F 1/1686* (2013.01); *G06F 3/03545* (2013.01); *G06F 3/0425* (2013.01); *G06F 9/451* (2018.02); *G06F 9/453* (2018.02)

(58) Field of Classification Search
CPC ..... G06F 3/0425; G06F 3/03545; G06F 9/453
See application file for complete search history.

(56) References Cited

U.S. PATENT DOCUMENTS

| | | | | |
|---|---|---|---|---|
| 8,913,037 | B1* | 12/2014 | Liu | G06F 3/0425 345/175 |
| 9,158,389 | B1 | 10/2015 | Sharma et al. | |
| 9,354,716 | B1* | 5/2016 | Sharma | H04N 5/2252 |
| 2008/0260244 | A1* | 10/2008 | Kaftory | H04N 1/6033 382/165 |
| 2014/0267409 | A1* | 9/2014 | Fein | G06T 11/00 345/633 |
| 2014/0354593 | A1* | 12/2014 | Rotaru | G06F 3/0482 345/174 |
| 2015/0339532 | A1 | 11/2015 | Sharma et al. | |
| 2016/0378296 | A1 | 12/2016 | Mishra et al. | |
| 2017/0140552 | A1* | 5/2017 | Woo | G06F 1/163 |

FOREIGN PATENT DOCUMENTS

DE 112011102169 4/2013

* cited by examiner

*Primary Examiner* — Seth A Silverman
(74) *Attorney, Agent, or Firm* — Patent Law Works LLP

(57) ABSTRACT

Various implementations for object detection include a method includes capturing a video stream that includes an activity object and a pointing object, identifying the activity object, displaying a graphical user interface embodying a virtual scene based on the identified activity object, determining a location of the pointing object relative to the activity object, determining a routine based on the location of the pointing object relative to the activity object, and executing the routine within the virtual scene.

23 Claims, 12 Drawing Sheets

DETECTION OF POINTING OBJECT AND ACTIVITY OBJECT

CROSS-REFERENCE TO RELATED APPLICATIONS

The present application claims the benefit under 35 U.S.C. § 119(e) of U.S. Provisional Patent Application Ser. No. 62/609,089, entitled "Virtual Response to Physical Interaction," filed on Dec. 21, 2017, the entire contents of which are incorporated herein by reference.

BACKGROUND

The present disclosure relates to object detection, and in a more specific non-limiting example, detection of physical objects associated with an activity object.

A tangible object visualization system allows a user to use the visualization system to capture tangible objects and see the objects presented as visualizations on an interface within the system. Providing software-driven visualizations associated with the tangible objects allows for the user to interact and play with tangible objects while also realizing the creative benefits of the software visualization system. This can create an immersive experience where the user has both tangible and digital experiences that interact with each other.

In some solutions, objects may be placed near the visualization system and a camera may capture images of the objects for image processing. However, the images captured by the camera for image processing, require the object to be placed in a way that the image processing techniques can recognize the object. Often, when a user is playing with the object, such as when using the visualization system, the object will be obscured by the user or a portion of the user's hand and the movement and placement of the visualization system may result in poor lighting and image capture conditions. As such, significant time and processing must be spent to identify the object and if the image cannot be analyzed because of poor quality or the object being obscured, then a new image must be captured, potentially resulting in losing a portion of an interaction with the object by the user.

Some visualization systems attempt to address this problem by limiting the ways in which a user can interact with an object in order to capture images that are acceptable for image processing. However, limiting the interactions, such as by requiring a user to place an object and not touch it, often create a jarring experience in which the user is not able to be immersed in the experience because of the constraints needed to capture the interactions with the object.

Further issues arise in that specific setup of specialized objects in a specific configuration is often required in order to interact with the objects and the system. For example, an activity surface must be carefully set up to comply with the calibrations of the camera and if the surface is disturbed, such as when it is bumped or moved by a user, the image processing loses referenced calibration points and will not work outside of the constraints of the specific setup. These difficulties in setting up and using the visualization systems, along with the high costs of these specialized system has led to limited adoption of the visualization systems because of the user is not immersed in their interactions with the objects.

SUMMARY

According to one innovative aspect of the subject matter in this disclosure, a method for detecting a pointing object and activity object is described. In an example implementation, a method includes capturing, using a video capture device coupled to a computing device, a video stream of a physical activity scene proximate to the computing device, the video stream including an activity object and a pointing object, the activity object including a visualization marker on the activity object; identifying, using a processor of the computing device, the activity object based on the visualization marker on the activity object; displaying, on a display of a computing device, a graphical user interface embodying a virtual scene based on the identified activity object; determining, using the processor of the computing device, a location of the pointing object relative to the activity object in the physical activity scene; determining, using the processor of the computing device, a routine based on the location of the pointing object relative to the activity object; and executing, on the display of the computing device, the routine within the virtual scene on the graphical user interface.

Implementations may include one or more of the following features. The method where the virtual scene includes a prompt, the prompt representing a point on the activity object. The method where determining the routine based on the location of the pointing object relative to the activity object, further includes: determining, using the processor of the computing device, a distance between the location of the pointing object relative to a location of the point on the activity object; and responsive to determining the distance satisfies a selection threshold, executing an interaction routine within the virtual scene on the graphical user interface. The method where the visualization marker includes a detectable graphic incorporated into the activity object, the detectable graphic being detectable by the processor of the computing device. The method where the pointing object includes a pointing marker, the pointing marker being detectable by the processor of the computing device to determine the location of the pointing object relative to the activity object. The method where the video capture device includes a field of view that encompasses a portion of the physical activity scene and where the activity object extends beyond the field of view of the video capture device. The method where the activity object is movable to allow different portions of the activity object to appear within the field of view of the video capture device. The method further including: detecting, using the processor of the computing device, a movement of the activity object; and determining, using the processor of the computing device, an updated location of the pointing object relative to the movement of the activity object. The method where determining the location of the pointing object relative to the activity object further includes: mapping, using the processor of the computing device, one or more sections of the activity scene into a grid; and determining, using the processor of the computing device, the location of the pointing object relative to a specific section of the one or more sections of the grid.

One general aspect includes a physical activity scene visualization system including: a video capture device coupled for communication with a computing device, the video capture device being adapted to capture a video stream that includes an activity object and a pointing object; a detector coupled to the computing device, the detector being adapted to identify within the video stream the activity object and a location of the pointing object relative to the activity object; a processor of the computing device, the processor being adapted to determine a routine based on the location of the pointing object relative to the activity object; and a display coupled to the computing device, the display being adapted to display a graphical user interface that includes a virtual scene and the routine.

Implementations may include one or more of the following features. The physical activity scene visualization system where the virtual scene includes a prompt, the prompt representing a point on the activity object. The physical activity scene visualization system where the processor that is adapted to determine the routine, is further configured to: determine a distance between the location of the pointing object relative to a location of the point on the activity object; responsive to determining the distance satisfies a selection threshold, executing on the display, an interaction routine within the virtual scene on the graphical user interface. The physical activity scene visualization system where the activity object further includes a visualization marker detectable by the detector, the visualization marker including a graphic incorporated into the activity object. The physical activity scene visualization system where the pointing object includes a pointing marker, the pointing marker being detectable by the detector to determine the location of the pointing object relative to the activity object. The physical activity scene visualization system where the video capture device includes a field of view that encompasses a portion of the physical activity scene and where the activity object extends beyond the field of view of the video capture device. The physical activity scene visualization system where the activity object is movable to allow different portions of the activity object to appear within the field of view of the video capture device. The physical activity scene visualization system where the detector is further configured to: detect a movement of the activity object; and determine an updated location of the pointing object relative to the movement of the activity object. The physical activity scene visualization system where the detector is further configure to: map one or more sections of the activity scene into a grid; and determine the location of the pointing object relative to a specific section of the one or more sections of the grid.

One general aspect includes a method including: capturing, using a video capture device coupled to a computing device, a video stream of a physical activity scene proximate to the computing device, the video stream including an activity object and a pointing object, the activity object including a visualization marker on the activity object and the pointing object including a pointing marker; identifying, using a processor of the computing device, a type of the activity object based on the visualization marker on the activity object; displaying, on a display of a computing device, a graphical user interface embodying a virtual scene based on the identified type of the activity object; determining, using the processor of the computing device, a position and an orientation of the activity object based on the visualization marker on the activity object; determining, using the processor of the computing device, a location of the pointing object relative to the position and the orientation of the activity object in the physical activity scene; determining, using the processor of the computing device, a routine based on the location of the pointing object relative to the position and the orientation of the activity object; and executing, on the display of the computing device, the routine within the virtual scene on the graphical user interface.

Implementations may include one or more of the following features. The method where the activity object includes a graphical element, the virtual scene includes a prompt displaying a representation of the graphical element, and determining the location of the pointing object further includes: determining, using the processor of the computing device, the location of the pointing object relative to a location of the graphical element in the activity object. The method further including: determining, using the processor of the computing device, a distance between the location of the pointing object and the location of the graphical element.

Other implementations of one or more of these aspects and other aspects described in this document include corresponding systems, apparatus, and computer programs, configured to perform the actions of the methods, encoded on computer storage devices. The above and other implementations are advantageous in a number of respects as articulated through this document. Moreover, it should be understood that the language used in the present disclosure has been principally selected for readability and instructional purposes, and not to limit the scope of the subject matter disclosed herein.

BRIEF DESCRIPTION OF THE DRAWINGS

The disclosure is illustrated by way of example, and not by way of limitation in the figures of the accompanying drawings in which like reference numerals are used to refer to similar elements.

DETAILED DESCRIPTION

The technology described herein provides a platform for detecting a pointing object relative to an activity object in a physical activity scene and executing a routine in a virtual scene based on the location of the pointing object. For example, a user may move the pointing object to be located at a first portion of the activity object, such as a portion of the activity object that includes an image or an object. The platform may determine the location of the pointing object at that portion of the activity object that includes the image or object and that the pointing object is directed towards the image or object. The platform may then execute the virtual routine on the display screen. By detecting the interactions in physical activity scene between the pointing object and the activity object, a user is able to manipulate, control, progress, and access various functionalities of the virtual scene without removing themselves from the immersiveness of a physical activity scene.

Figure 1A:
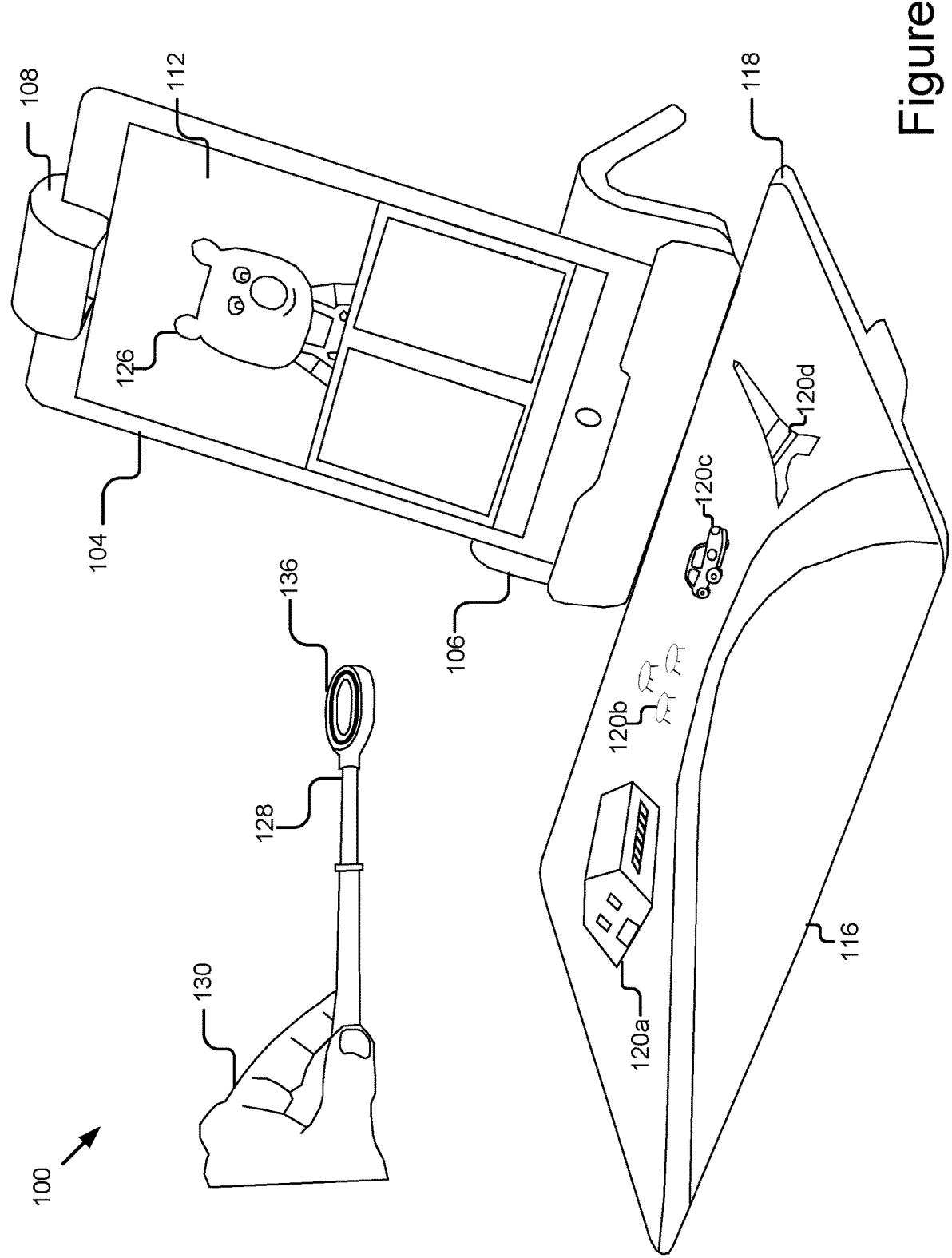
FIGS. 1A-1C illustrate an example configuration for detection of a physical object and activity object.

FIG. 1A is an example configuration 100 for detection of a pointing object 128 and an activity object 116. The configuration 100 may be used for various activities in a physical activity scene 102 (not shown). As depicted, the configuration 100 includes, in part, a tangible, physical activity surface on which the activity object 116 and the pointing object 128 may be used and detected by a computing device 104. In some implementations, the computing device 104 may be situated in a stand 106. In some implementations, the physical activity surface may also include one or more tangible interface object(s) that may be placed (e.g., drawn, created, molded, built, projected, etc.) on and/or around the activity object 116. In some implementations, graphical elements 120 may be incorporated and/or situated within the activity object 116, such as by being printed as graphical elements on the activity object 116 or separate tokens/objects that can be placed on the activity object 116.

In some implementations, the configuration 100 may include a computing device 104 that is equipped or otherwise coupled to a video capture device 110 (not shown) configured to capture video of the activity surface 102. In some implementations, the video capture device 110 may be a camera and an adapter 108 may be situated over the camera, such as to redirect the at least a portion of a field of view of the video capture device 110. The computing device 104 includes novel software and/or hardware capable of displaying a virtual scene 112.

In some implementations, the virtual scene may include a graphical user interface that presented on a display of the computing device 104. In some implementations, the virtual scene 112 may include a virtual character 126 and/or a prompt 134 (not shown). In further implementations, the virtual scene 112 may be configured to display a virtualization one or more features detected on the physical activity surface, such as the activity object 116, the pointing object 128, and/or the graphical element 120. The virtualization may be generated by the computing device 104 and include the detected features on the physical activity surface.

In some implementations, the pointing object 128 may be controlled, such as by a user 130, and the user 130 may use the pointing object 128 to interact with the activity object 116. In some implementations, the pointing object 128 may include a pointing marker 136 that is detectable by the computing device 104. In some implementations, the pointing marker 136 may incorporate contrasting colors, such as a dark colored ring surrounded by light coloring that offsets the dark colored ring. In further implementations, contrasting colors and/or shapes may be included on the pointing object 128 that are detectable in a captured video stream.

In some implementations, the pointing object 128 may include a specific shape and/or configuration that is detectable by the computing device 104, such as rod, a pointer, a pencil, etc. In further implementations, the pointing object 128 may include a tip that includes specific features for pointing/indicating in the activity object 116. For example, the tip of the pointing object 128 may include a ring with a hollowed out center that can be placed over a graphical element 120 on the activity object 116. In further implementations, the tip of the pointing object 128 may include specific patterns and/or features that the computing device 104 may use to detect and/or determine a position of where the tip of the pointing object 128 is located relative to the activity object 116.

While the activity surface 102 (not shown in FIG. 1) may be substantially horizontal, it should be understood that the activity surface 102 can also be vertical and/or positioned at any other angle suitable to the user for detection of pointing object 128 and/or the activity object 116. The activity surface 102 can have any color, pattern, texture, and topography. For instance, the activity surface 102 can be substantially flat or be disjointed/discontinuous in nature. Non-limiting examples of an activity surface 102 include a table, desk, counter, ground, a wall, a whiteboard, a chalkboard, a customized surface, etc. The activity surface 102 may additionally or alternatively include a medium on which the user may render tangible interface object(s), such as paper, canvas, fabric, clay, foam, or other suitable medium.

Figure 1B:
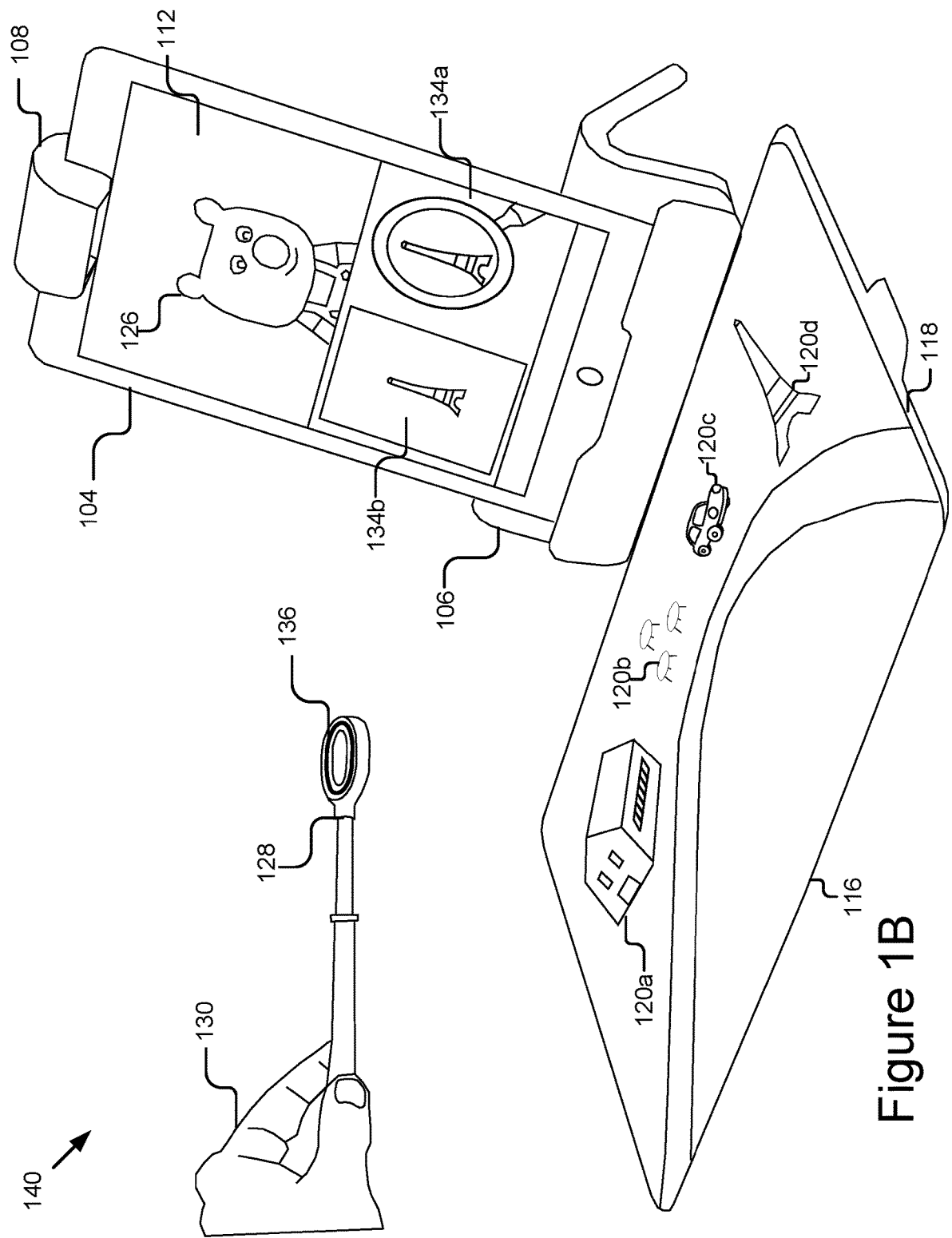
Figure 1C:
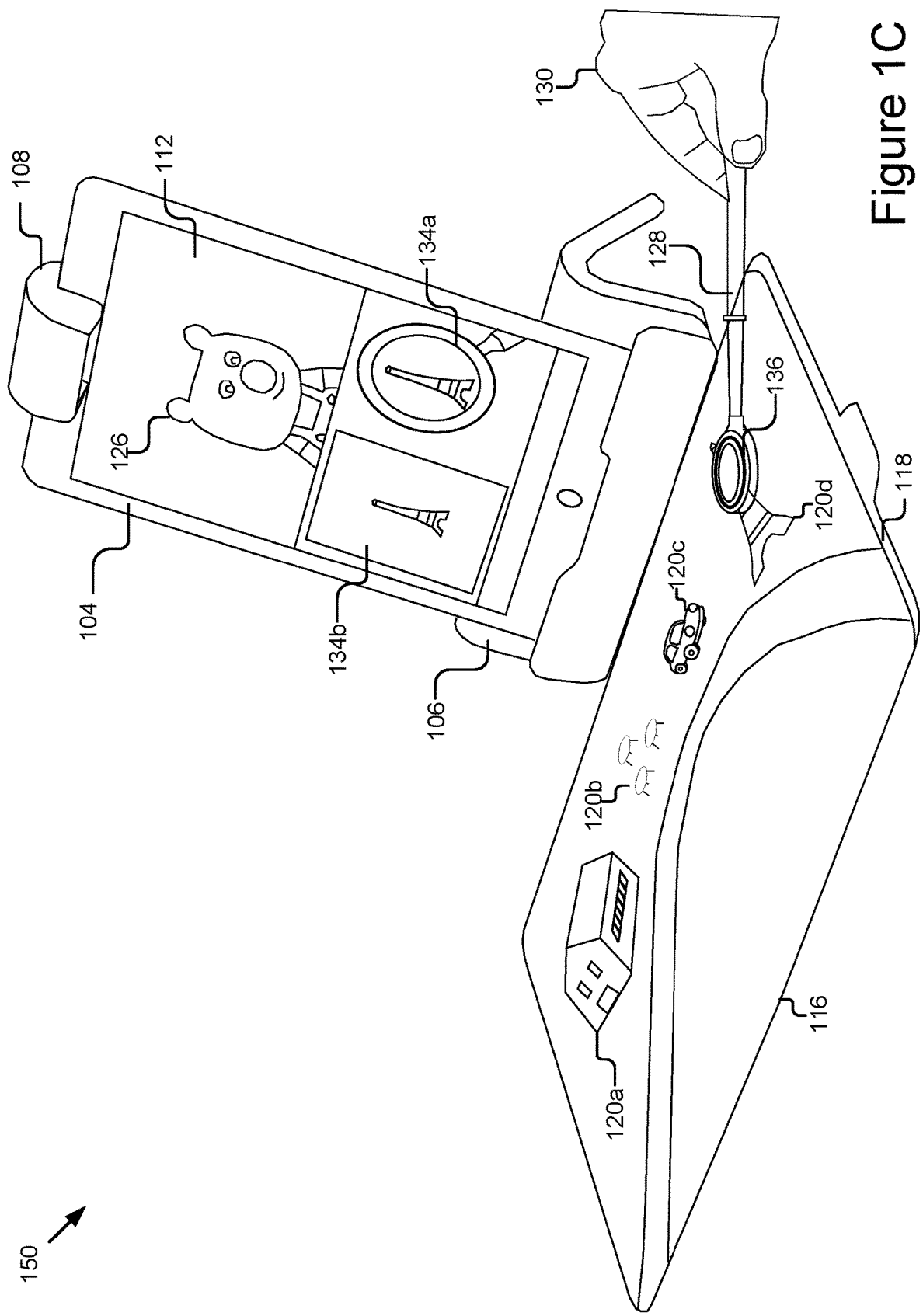

In some implementations, the activity surface 102 may be preconfigured for certain activities. As depicted in FIGS. 1A-1C, an example configuration may include an activity surface 102 that includes the activity object 116 separate from the activity surface 102. In some implementations, the activity object 116 may be any type of object that may be used for interacting in the virtual scene 112. It should be understood that while the activity object 116 is presented as a surface, such as an activity board made out of sturdy plastic, metal, and/or cardboard, in further implementations, the activity object 116 may take on any form such as a ball, a vehicle track, a book, a tangible object etc. In some implementations, the activity object 116 may include one or more graphical elements 120 that may be printed, drawn, molded, projected, or otherwise presented or placed, on the surface of the activity object 116. In further implementations, the activity object 116 may be configured for creating and/or drawing, such as a whiteboard or drawing board.

In some implementations, the activity object 116 may be configured to couple with a portion of the stand 106 or may be distinct from the stand 106 but placeable and/or positioned adjacent to the stand 106. In some implementations, the activity object 116 may have built in buttons or other tangible interface object(s) that may be incorporated directly into the activity object 116 (not shown). In further implementations, the activity object 116 may have portions that included markings, such as a detectable graphic 118, that may be detectable by the computing device 104. In some implementations, the detectable graphic 118 may be used by the computing device to determine a type of the activity object 116. For example, a set of activity objects 116 may include multiple activity objects 116 that each depict different scenarios and each include different graphical elements 120. The computing device 104 may identify which activity object 116 was placed on the physical activity surface 102 by detecting a detectable graphic 118 unique to that scenario of activity object 116. By automatically determining the type of activity object 116 and the scenario depicted on the activity object 116, an application running in the virtual scene 112 may be presented without requiring input from the user 130 indicating what type of activity to run. For example, the user 130 may place a specific type of activity object 116 on the physical activity surface 102 and the computing device 104 may present an activity for the user 130 in the virtual scene 112 based on the type of activity object 116.

In some instances, the size of a detectable area on the activity object 116 may be bounded by the field of view of the video capture device 110 and can be adapted by an adapter 108 and/or by adjusting the position of the video capture device 110. In some implementations, as described elsewhere herein, the activity object 116 may extend beyond a portion of the field of view of the video capture device 110 and the computing device 104 may be configured to determine the portion of the activity object 116 that is included within the field of view of the video capture device 110, such as by identifying the detectable graphic 118 and/or a graphical element 120 present in that portion of the activity object 116.

The computing device 104 included in the example configuration 100 may be situated on the physical activity surface 102 or otherwise proximate to the physical activity surface 102. The computing device 104 can provide the user(s) with a virtual portal for displaying the virtual character 126 and/or virtualizations. For example, the computing device 104 may be placed on a table in front of a user so the user can easily see the computing device 104 while using the pointing object 128 to interact with the activity object 116. Example computing devices 104 may include, but are not limited to, mobile phones (e.g., feature phones, smart phones, etc.), tablets, laptops, desktops, netbooks, TVs, set-top boxes, media streaming devices, portable media players, navigation devices, personal digital assistants, etc.

The computing device 104 includes or is otherwise coupled (e.g., via a wireless or wired connection) to the video capture device 110 (also referred to herein as a camera) for capturing a video stream of the activity object 116 and/or the pointing object 128. As depicted in FIGS. 1A-1C the video capture device 110 may be a front-facing camera that is equipped with an adapter 108 that adapts the field of view of the camera 110 to include, at least in part, the physical activity surface 102.

As depicted in FIGS. 1A-1C, the computing device 104 and/or the video capture device 110 may be positioned and/or supported by the stand 106. For instance, the stand 106 may position the display of the video capture device 110 in a position that is optimal for viewing the activity object 116 and/or the pointing object 128 as the pointing object 128 is moved by the user 130, such as to interacting with the physical environment (activity object 116). The stand 106 may be configured to rest on the activity surface 102 and receive and sturdily hold the computing device 104 so the computing device 104 remains still during use.

In some implementations, the adapter 108 adapts a video capture device 110 (e.g., front-facing, rear-facing camera) of the computing device 104 to capture substantially only the activity object 116 or a portion of the activity object 116, although numerous further implementations are also possible and contemplated. For instance, the camera adapter 108 can split the field of view of the front-facing camera into two scenes. In this example with two scenes, the video capture device 110 captures an activity object 116 that includes two different portions and is able to simultaneously capture tangible interface object(s) in either portion of the activity object 116. In another example, the camera adapter 108 can redirect a rear-facing camera of the computing device (not shown) toward a front-side of the computing device 104 to capture the activity object 116 located in front of the computing device 104. In some implementations, the adapter 108 can define one or more sides of the scene being captured (e.g., top, left, right, with bottom open).

The adapter 108 and stand 106 for a computing device 104 may include a slot for retaining (e.g., receiving, securing, gripping, etc.) an edge of the computing device 104 to cover at least a portion of the camera 110. The adapter 108 may include at least one optical element (e.g., a mirror) to direct the field of view of the camera 110 toward the activity surface 102. The computing device 104 may be placed in and received by a compatibly sized slot formed in a top side of the stand 106. The slot may extend at least partially downward into a main body of the stand 106 at an angle so that when the computing device 104 is secured in the slot, it is angled back for convenient viewing and utilization by its user 130 or users. The stand 106 may include a channel formed perpendicular to and intersecting with the slot. The channel may be configured to receive and secure the adapter 108 when not in use. For example, the adapter 108 may have a tapered shape that is compatible with and configured to be easily placeable in the channel of the stand 106. In some instances, the channel may magnetically secure the adapter 108 in place to prevent the adapter 108 from being easily jarred out of the channel. The stand 106 may be elongated along a horizontal axis to prevent the computing device 104 from tipping over when resting on a substantially horizontal activity surface (e.g., a table). The stand 106 may include channeling for a cable that plugs into the computing device 104. The cable may be configured to provide power to the computing device 104 and/or may serve as a communication link to other computing devices, such as a laptop or other personal computer.

In some implementations, the adapter 108 may include one or more optical elements, such as mirrors and/or lenses, to adapt the standard field of view of the video capture device 110. For instance, the adapter 108 may include one or more mirrors and lenses to redirect and/or modify the light being reflected from activity surface 102 into the video capture device 110. As an example, the adapter 108 may include a mirror angled to redirect the light reflected from the activity surface 102 in front of the computing device 104 into a front-facing camera of the computing device 104. As a further example, many wireless handheld devices include a front-facing camera with a fixed line of sight with respect to the display 320. The adapter 108 can be detachably connected to the device over the camera 110 to augment the line of sight of the camera 110 so it can capture the activity surface 102 (e.g., surface of a table). The mirrors and/or lenses in some implementations can be polished or laser quality glass. In other examples, the mirrors and/or lenses may include a first surface that is a reflective element. The first surface can be a coating/thin film capable of redirecting light without having to pass through the glass of a mirror and/or lens. In an alternative example, a first surface of the mirrors and/or lenses may be a coating/thin film and a second surface may be a reflective element. In this example, the lights passes through the coating twice, however since the coating is extremely thin relative to the glass, the distortive effect is reduced in comparison to a conventional mirror. This mirror reduces the distortive effect of a conventional mirror in a cost effective way.

In another example, the adapter 108 may include a series of optical elements (e.g., mirrors) that wrap light reflected off of the activity surface 102 located in front of the computing device 104 into a rear-facing camera of the computing device 104 so it can be captured. The adapter 108 could also adapt a portion of the field of view of the video capture device 110 (e.g., the front-facing camera) and leave a remaining portion of the field of view unaltered so that multiple scenes may be captured by the video capture device 110 as shown in FIGS. 1A-1C. The adapter 108 could also include optical element(s) that are configured to provide different effects, such as enabling the video capture device 110 to capture a greater portion of the physical activity surface 102. For example, the adapter 108 may include a convex mirror that provides a fisheye effect to capture a larger portion of the physical activity surface 102 than would otherwise be capturable by a standard configuration of the video capture device 110.

The video capture device 110 could, in some implementations, be an independent unit that is distinct from the computing device 104 and may be positionable to capture the physical activity surface 102 or may be adapted by the adapter 108 to capture the activity surface 102 as discussed above. In these implementations, the video capture device 110 may be communicatively coupled via a wired or wireless connection to the computing device 104 to provide it with the video stream being captured.

FIG. 1B illustrates an example configuration 140 for detection of the pointing object 128 and the activity object 116. In FIG. 1B, a prompt 134 is displayed in the virtual scene 112. In some implementations, the prompt 134 may include a graphical representation of a graphical element 120. The prompt 134 may be displayed responsive to an application executing on the computing device 104. For example, the computing device 104 may detect that the type of the activity object 116 is a map of Paris and the prompt 134 may display a graphical representation of the Eiffel Tower. The prompt 134 may signal to the user 130 an objective for the user to identify within the activity object 116, such as in the example, for the user 130 to find the graphical element 120d that depicts the Eiffel Tower. In some implementations, the prompt 134 may include a graphical representation of a graphical element, such as an image of the Eiffel Tower, a textual prompt, such as the phrase "Find the Eiffel Tower," or other elements that may convey an objective to the user 130. As shown in FIG. 1B, the prompt 134 includes a graphical representation of the objective in a first window 134b and a graphical representation of the pointing object 128 pointing to the objective in a second window 134a.

In some implementations, the prompt 134 may include a hint displayed in the virtual scene 112. For example, a user 130 may select the hint, or it may automatically display, and the hint may include a graphical representation of a portion of the activity object 116 that includes the objective shown in the prompt 134. In one example, the hint may display a graphical representation of the right half of the activity object that includes the graphical element 120d representing the Eiffel Tower. In some implementations, additional hints may also be presented, such as responsive to a selection by the user 130 or an expiration of a time period. The additional hints may highlight progressively smaller portions of the graphical representation of the activity object 116. In further implementations, the hints and/or the additional hints may be textual descriptions of a location on the activity object, grid coordinates, or other clues to provide assistance to the user 130 in identifying the objective of the prompt 134.

In some implementations, the virtual character 126 may include animations that may be displayed in the virtual scene 112. In some implementations, the animations may include the virtual character 126 displaying positive characteristics and/or negative characteristics as the user 130 moves the pointing object 128 around the activity object 116. The positive and/or negative characteristics may include animations that are happy, excited, sad, confused, etc. and may be displayed responsive to a determination of a location of the pointing object 128 relative to the activity object 116. For example, as the location of the pointing object 128 is determined to be close to the location of the objective graphical element 120d, e.g., the Eiffel Tower, the virtual character 126 may display a happy characteristic and alternatively if the location of the pointing object 128 is determined to be farther away from the location of the objective graphical element 120d, the virtual character 126 may display a sad characteristic.

In some implementations, the animations of the virtual character 126 may include an animation of the eyes of the virtual character 126. For example, the eyes of the virtual character 126 may track the pointing object 128 as the pointing object 128 is moved around by the user 130 on the activity object 116. In further implementations, if the pointing object 128 is moved outside of the field of view of the video capture device 110, the eyes of the virtual character 126 may be pointed towards a predicted location of where the pointing object 128 is currently located, based on the last detected location of the pointing object 128. In further implementations, the eyes of the virtual character 126 may alternatively point towards the location of the objective in the activity object 116. For example, if the objective displayed in the prompt is the Eiffel Tower, the eyes of the virtual character 126 may point towards the graphical element 120d representing the Eiffel Tower in the activity object 116. In some implementations, the eyes of the virtual character 126 may continue to point towards the graphical element 120d even if the activity object 116 is moved such that the portion of the activity object 116 that includes graphical element 120d is outside of the field of view of the video capture device 110, the eyes of the virtual character 126 may continue to be pointed towards a predicted location of the graphical element 120d. By directing the eyes of the virtual character 126, or other visual animations, a user 130 may receive subconscious signals from the virtual character 126 that are intuitive and allow for greater immersiveness in the application.

In FIG. 1C, the pointing object 128 is positioned by the user 130 to interact with the graphical element 120d in the activity object 116. In this example, the graphical element 120d depicts the Eiffel Tower and the prompt 132 depicts a graphical representation of the Eiffel Tower in the virtual scene 112. In some implementations, the computing device 104 may determine the location of the pointing object 128 relative to the activity object 116. For example, the computing device 104 may determine that the detectable portion of the pointing object 128, such as the end that includes the pointing marker 136, is pointing to the graphical element 120d in the activity object 116. In some implementations, responsive to determining that the pointing marker 136 is pointing to the graphical element 120d, the virtual scene may display a routine executed by the computing device, such as a interaction routine when the correct objective is pointed to by the pointing object 128, or an assistive routine when an incorrect objective is pointed to by the pointing object 128.

In some implementations, the computing device 104 may determine that the pointing object 128 is pointing to the graphical element 120d when a distance between the location of the pointing object 128 and the location of the point on the activity object 116 is determined. In some implementations, the distance may be measured in common units, such as inches or meters, while in further implementations, the distance may be measured in pixels or another type of metric. In some implementations, the computing device 104 may determine if the distance between two locations satisfies a selection threshold. The selection threshold may be a predetermined distance wherein the computing device 104 determines that the location of the pointing object 128 is substantially similar to the location of the point. The predetermined distance can be different for different for a variety of implementations depending on a desired accuracy of the pointing object 128 and the activity being executed in the virtual scene 112. In some implementations, the pointing marker 136 is mapped to a substantially similar grid portion as the graphical element 120d. For example, in some implementations, the computing device 104 may create a virtual grid based on locations of one or more graphical elements 120 and/or detectable graphics 118 in the activity object 116. The grid may include squares, or other shapes, that are sufficiently small enough to capture individual graphical elements on the activity object, e.g., if the graphical elements are half an inch, the virtual grid may be broken up into half-inch sections, although other sizes of grids are also contemplated. The computing device 104 may determine that the location of the pointing object 128 is substantially similar to the location of the graphical element 120 when both locations are mapped to the same virtual grid section. In further implementations, the locations may be substantially similar when both locations are mapped to adjacent grid sections, or within a specific threshold distance of grid sections. In some implementations, the virtual grid sections are determined in software and not shown in the virtual scene 112, while in further implementations, the virtual grid sections may be displayed in the virtual scene 112, such as to further guide the user 130. It should be understood that in some implementations, the activity object 116 may be moveable, and the location of the pointing object 128 is determined relative to the activity object 116 because the virtual grid and/or the locations of the graphical elements 120 are not static in the physical activity scene since the activity object 116 can be moved.

Figure 2:
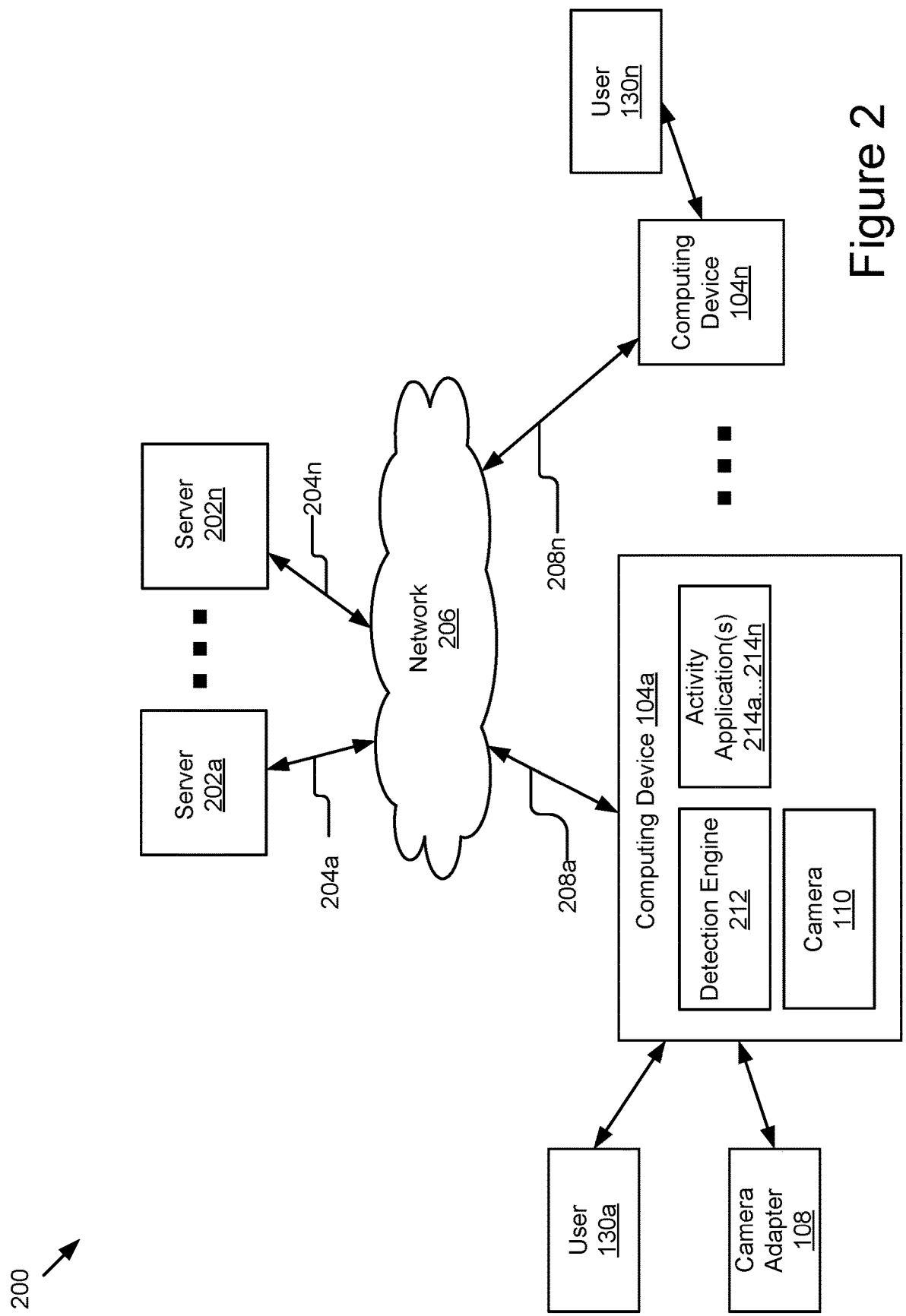
FIG. 2 is a block diagram illustrating an example computer system for detection of a physical object and activity object.

FIG. 2 is a block diagram illustrating an example computer system 200 for detection of a pointing object 128 and activity object 116. The illustrated system 200 includes computing devices 104*a* . . . 104*n* (also referred to individually and collectively as 104) and servers 202*a* . . . 202*n* (also referred to individually and collectively as 202), which are communicatively coupled via a network 206 for interaction with one another. For example, the computing devices 104*a* . . . 104*n* may be respectively coupled to the network 206 via signal lines 208*a* . . . 208*n* and may be accessed by users 222*a* . . . 222*n* (also referred to individually and collectively as 222). The servers 202*a* . . . 202*n* may be coupled to the network 206 via signal lines 204*a* . . . 204*n*, respectively. The use of the nomenclature "a" and "n" in the reference numbers indicates that any number of those elements having that nomenclature may be included in the system 200.

The network 206 may include any number of networks and/or network types. For example, the network 206 may include, but is not limited to, one or more local area networks (LANs), wide area networks (WANs) (e.g., the Internet), virtual private networks (VPNs), mobile (cellular) networks, wireless wide area network (WWANs), WiMAX® networks, Bluetooth® communication networks, peer-to-peer networks, other interconnected data paths across which multiple devices may communicate, various combinations thereof, etc.

The computing devices 104*a* . . . 104*n* (also referred to individually and collectively as 104) are computing devices having data processing and communication capabilities. For instance, a computing device 104 may include a processor (e.g., virtual, physical, etc.), a memory, a power source, a network interface, and/or other software and/or hardware components, such as front and/or rear facing cameras, display, graphics processor, wireless transceivers, keyboard, camera, sensors, firmware, operating systems, drivers, various physical connection interfaces (e.g., USB, HDMI, etc.). The computing devices 104*a* . . . 104*n* may couple to and communicate with one another and the other entities of the system 200 via the network 206 using a wireless and/or wired connection. While two or more computing devices 104 are depicted in FIG. 2, the system 200 may include any number of computing devices 104. In addition, the computing devices 104*a* . . . 104*n* may be the same or different types of computing devices.

As depicted in FIG. 2, one or more of the computing devices 104*a* . . . 104*n* may include a camera 110, a detection engine 212, and activity application(s) 214. One or more of the computing devices 104 and/or cameras 110 may also be equipped with an adapter 108 as discussed elsewhere herein. The detection engine 212 is capable of detecting and/or recognizing a visualization marker, such as a detectable graphic 118, a pointing object 128, graphical elements 120, and/or tangible interface object(s), a position of the pointing object 128, and/or location of the pointing object in/on the activity object 116 (within field of view of camera 110). The detection engine 212 can detect the position and orientation of the visualization markers, graphical elements 120 and/or tangible interface object(s) in physical space, detect how the visualization markers, graphical elements 120, and/or tangible interface object(s) 120, and cooperate with the activity application(s) 214 to provide users 130 with a rich virtual experience by detecting the location of the pointing object 128 relative to the activity object 116.

In some implementations, the detection engine 212 processes video captured by a camera 110 to detect a pointing marker 136 in the video stream and determine a location of the pointing object 128 relative to the activity object 116 may mapping the activity object 116 into a virtual grid. Additional structure and functionality of the computing devices 104 are described in further detail below with reference to at least FIG. 3.

The servers 202 may each include one or more computing devices having data processing, storing, and communication capabilities. For example, the servers 202 may include one or more hardware servers, server arrays, storage devices and/or systems, etc., and/or may be centralized or distributed/cloud-based. In some implementations, the servers 202 may include one or more virtual servers, which operate in a host server environment and access the physical hardware of the host server including, for example, a processor, memory, storage, network interfaces, etc., via an abstraction layer (e.g., a virtual machine manager).

The servers 202 may include software applications operable by one or more computer processors of the servers 202 to provide various computing functionalities, services, and/or resources, and to send data to and receive data from the computing devices 104. For example, the software applications may provide functionality for internet searching; social networking; web-based email; blogging; micro-blogging; photo management; video, music and multimedia hosting, distribution, and sharing; business services; news and media distribution; user account management; or any combination of the foregoing services. It should be understood that the servers 202 are not limited to providing the above-noted services and may include other network-accessible services.

It should be understood that the system 200 illustrated in FIG. 2 is provided by way of example, and that a variety of different system environments and configurations are contemplated and are within the scope of the present disclosure. For instance, various functionality may be moved from a server to a client, or vice versa and some implementations may include additional or fewer computing devices, services, and/or networks, and may implement various functionality client or server-side. Further, various entities of the system 200 may be integrated into a single computing device or system or additional computing devices or systems, etc.

Figure 3:
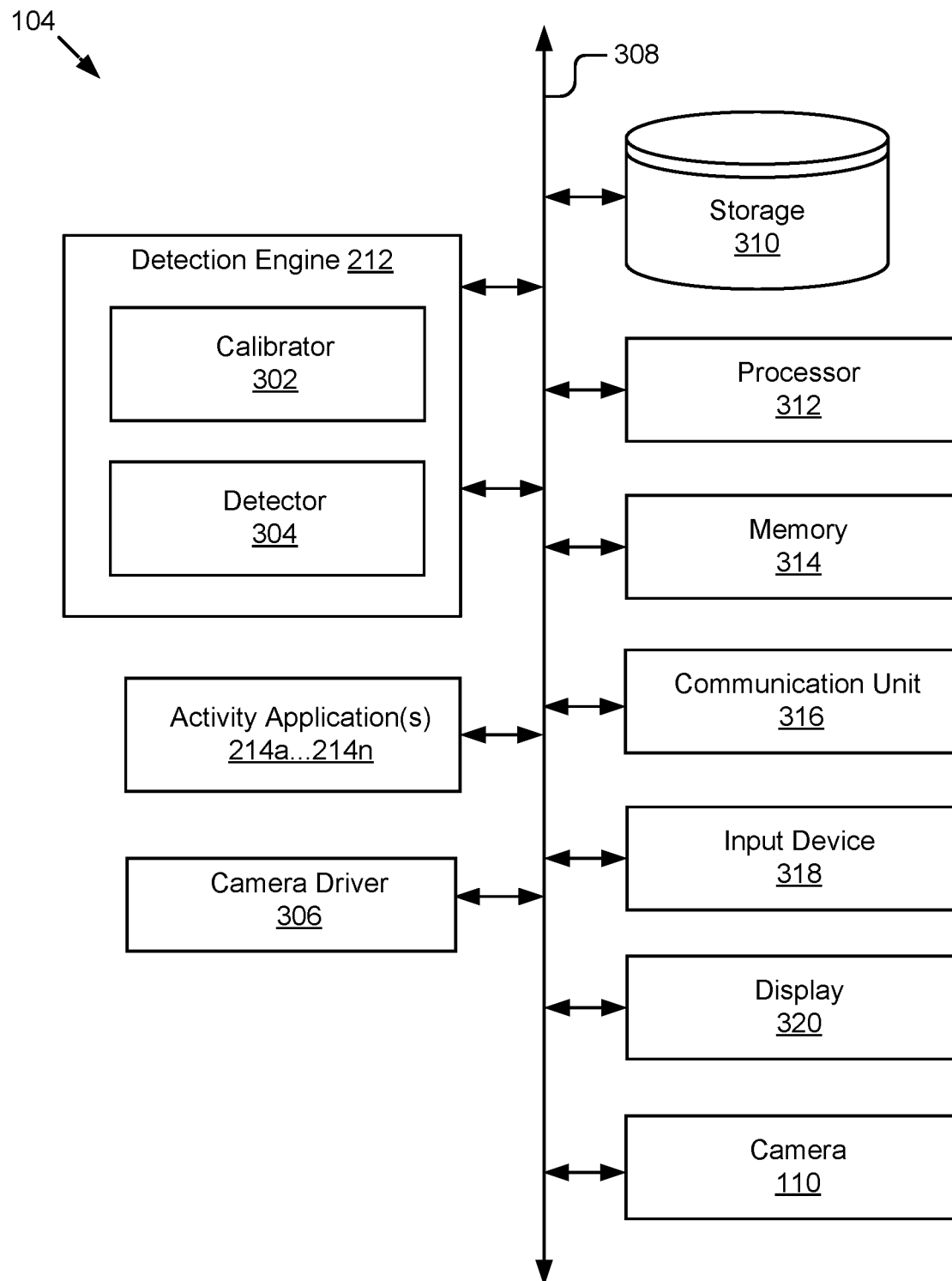
FIG. 3 is a block diagram illustrating an example computing device.

FIG. 3 is a block diagram of an example computing device 104. As depicted, the computing device 104 may include a processor 312, memory 314, communication unit 316, display 320, camera 110, and an input device 318, which are communicatively coupled by a communications bus 308. However, it should be understood that the computing device 104 is not limited to such and may include other elements, including, for example, those discussed with reference to the computing devices 104 in FIGS. 1A-1C and 2.

The processor 312 may execute software instructions by performing various input/output, logical, and/or mathematical operations. The processor 312 has various computing architectures to process data signals including, for example, a complex instruction set computer (CISC) architecture, a reduced instruction set computer (RISC) architecture, and/or an architecture implementing a combination of instruction sets. The processor 312 may be physical and/or virtual, and may include a single core or plurality of processing units and/or cores.

The memory 314 is a non-transitory computer-readable medium that is configured to store and provide access to data to the other elements of the computing device 104. In some implementations, the memory 314 may store instructions and/or data that may be executed by the processor 312. For example, the memory 314 may store the detection engine 212, the activity application(s) 214, and the camera driver 306. The memory 314 is also capable of storing other instructions and data, including, for example, an operating system, hardware drivers, other software applications, data, etc. The memory 314 may be coupled to the bus 308 for communication with the processor 312 and the other elements of the computing device 104.

The communication unit 316 may include one or more interface devices (I/F) for wired and/or wireless connectivity with the network 206 and/or other devices. In some implementations, the communication unit 316 may include transceivers for sending and receiving wireless signals. For instance, the communication unit 316 may include radio transceivers for communication with the network 206 and for communication with nearby devices using close-proximity (e.g., Bluetooth®, NFC, etc.) connectivity. In some implementations, the communication unit 316 may include ports for wired connectivity with other devices. For example, the communication unit 316 may include a CAT-5 interface, Thunderbolt™ interface, FireWire™ interface, USB interface, etc.

The display 320 may display electronic images and data output by the computing device 104 for presentation to a user 130. The display 320 may include any conventional display device, monitor or screen, including, for example, an organic light-emitting diode (OLED) display, a liquid crystal display (LCD), etc. In some implementations, the display 320 may be a touch-screen display capable of receiving input from one or more fingers of a user 130. For example, the display 320 may be a capacitive touch-screen display capable of detecting and interpreting multiple points of contact with the display surface. In some implementations, the computing device 104 may include a graphics adapter (not shown) for rendering and outputting the images and data for presentation on display 320. The graphics adapter (not shown) may be a separate processing device including a separate processor and memory (not shown) or may be integrated with the processor 312 and memory 314.

The input device 318 may include any device for inputting information into the computing device 104. In some implementations, the input device 318 may include one or more peripheral devices. For example, the input device 318 may include a keyboard (e.g., a QWERTY keyboard), a pointing device (e.g., a mouse or touchpad), microphone, a camera, etc. In some implementations, the input device 318 may include a touch-screen display capable of receiving input from the one or more fingers of the user 130. For instance, the functionality of the input device 318 and the display 320 may be integrated, and a user 130 of the computing device 104 may interact with the computing device 104 by contacting a surface of the display 320 using one or more fingers. In this example, the user 130 could interact with an emulated (i.e., virtual or soft) keyboard displayed on the touch-screen display 320 by using fingers to contact the display 320 in the keyboard regions.

The detection engine 212 may include a detector 304. The elements 212 and 304 may be communicatively coupled by the bus 308 and/or the processor 312 to one another and/or the other elements 214, 306, 310, 314, 316, 318, 320, and/or 110 of the computing device 104. In some implementations, one or more of the elements 212 and 304 are sets of instructions executable by the processor 312 to provide their functionality. In some implementations, one or more of the elements 212 and 304 are stored in the memory 314 of the computing device 104 and are accessible and executable by the processor 312 to provide their functionality. In any of the foregoing implementations, these components 212, and 304 may be adapted for cooperation and communication with the processor 312 and other elements of the computing device 104.

The detector 304 includes software and/or logic for processing the video stream captured by the camera 110 to detect a location of the pointing object 128 relative to the activity object 116 in the video stream. In some implementations, the detector 304 may also identify features of the physical activity scene, such as the activity object 116, graphical elements 120 and/or tangible interface object(s) by identifying line segments of these components. In some implementations, the detector 304 may be coupled to and receive the video stream from the camera 110, the camera driver 306, and/or the memory 314. In some implementations, the detector 304 may process the images of the video stream to determine positional information for the line segments (e.g., location and/or orientation of the line segments in 2D or 3D space) and then analyze characteristics of the line segments included in the video stream to determine the identities and/or additional attributes of the line segments.

In some implementations, the detector 304 may recognize the line by identifying its contours. The detector 304 may also identify various attributes of the line, such as colors, contrasting colors, depth, texture, etc. In some implementations, the detector 304 may use the description of the line and the lines attributes to identify the graphical element 120 and/or tangible interface object(s) by comparing the description and attributes to a database of objects and identifying the closest matches.

In some implementations, the detector 304 may detect a pointing marker 136 by searching for a specific shape. In some implementations, the specific shape may be identified in the video stream by contrasting colors between the specific shape and the surrounding area. For example, the pointing marker 136 may be an ellipse in a black or darker color and the colors surrounding the pointing marker 136 may be a light color, such as a white, or yellow, although other contrasting colors and shapes are also contemplated. In some implementations, the pointing marker 136 may be a ring on the pointing object 128. In some examples, the ring may appear as an ellipse when the pointing marker 136 is laid substantially flat on the activity object 116. The detector 304 may identify candidate ellipses in a video stream and then filter the candidate ellipses by one or more of size, shape, and/or color of the candidate ellipses in order to quickly identify the pointing marker 136 associated with the pointing object 128. By focusing on the ellipses or other shapes and/or contrasting colors, the detector 304 can quickly reduce the quantity of objects detected during image processing and have a high degree of success identifying the pointing marker 136 quickly and with an efficient use of processing time and power.

In some implementations, the detector 304 may detect a visualization marker, such as a detectable graphic 118, in order to identify the type of activity object 116. In some implementations, the visualization marker may be used to determine a precise location of the activity object 116, including the position and/or rotation of the activity object 116 on the play surface. In some implementations, the visualization marker may be an example of keypoint detection and matching, where the keypoint may be a location in the image of the activity object 116 that has a relatively unique appearance and is also rich in texture for detection by the detector 304. In some implementations, the keypoint may be encoded in software by descriptors which may be vector representations of a keypoint image patch. In some implementations, the descriptors may have the property that two similar keypoint image patches in separate images may have similar descriptors. In some implementations, the detector may map an activity object 116 by identifying these keypoints for one or more different activity objects 116 and create a collection of keypoints and descriptors for each of the different activity objects 116. The detector 304 may provide the collection of keypoints and descriptors to the storage 310 and may be accessed by the detector at a later time to match a currently detected keypoint to the collection of keypoints and descriptors that were previously mapped. In real-time, or substantially real-time, the detector 304 may then match keypoints detected in an image from a video stream with the collection of keypoints and descriptors to identify matching keypoints. By matching keypoints, the detector 304 can provide a geometry of a placed activity object 116. In some implementations, the detector 304 may match the keypoints using common sampling techniques, such as a random sample consensus.

The detector 304 may be coupled to the storage 310 via the bus 308 to store, retrieve, and otherwise manipulate data stored therein. For example, the detector 304 may query the storage 310 for data matching any line segments and/or keypoints that it has determined are present in the activity object 116. In all of the above descriptions, the detector 304 may send the detected images to the detection engine 212 and the detection engine 212 may perform the above described features.

The detector 304 may be able to process the video stream to detect a location of the pointing object 128 relative to the activity object 116. In some implementations, the detector 304 may be configured to understand relational aspects between the pointing object 128 location and a location of a graphical element 120. For example, the detector 304 may be configured to identify when the pointing object 128 points to a graphical element 120 and the activity application(s) 214 may provide the information to the activity application(s) 214 in order to determine a routine based on what graphical element 120 the pointing object 128 is pointing to.

The activity application(s) 214 include software and/or logic for receiving a detected location of the pointing object 128, determining a routine, and executing the routine in the virtual scene. The activity application(s) 214 may be further configured to execute and display other aspects of an activity in the virtual scene 112, such as the virtual character 126, a prompt 134, and/or a hint. The activity application(s) 214 may be coupled to the detector 304 via the processor 312 and/or the bus 308 to receive the detected information. For example, responsive to the detector 304 determining, that the pointing object 128 points to a graphical element 120, the activity application(s) 214 may determine if the graphical element 120 is the graphical element 120 represented in the prompt 134 and execute a routine based on whether the graphical element 120 is the correct or incorrect based on the prompt 134. For example, the routines may include an interaction routine and/or an assistive routine. In the interaction routine, the activity application(s) 214 may execute an advancement, a reward, or any type of virtual interaction responsive to determining that the distance between the pointing object 128 and the point on the activity object 116 satisfy a selection threshold. In some implementations, the assistive routine may provide additions prompts 134, hints, or other guidance in the virtual scene 112 to guide the user to the point on the activity object 116 represented by the graphical element 120.

In some implementations, the activity application(s) 214 may determine the routine by searching through a database of routines that are compatible with the detected pointing object 128 information. In some implementations, the activity application(s) 214 may access a database of routines stored in the storage 310 of the computing device 104. In further implementations, the activity application(s) 214 may access a server 202 to search for routines. In some implementations, a user 130 may predefine a routine to include in the database of virtual responses.

In some implementations, the activity application(s) 214 may enhance the virtual scene 112 as part of the routine. For example, the activity application(s) 214 may display visual enhancements as part of executing the routine. The visual enhancements may include adding color, extra virtualizations, background scenery, etc. In further implementations, the visual enhancements may include having the virtual character 126 interact with a visualization of a detected tangible interface object(s) in the activity scene, such as a specific type of pointing object 128, etc.

In some instances, the manipulation of the tangible interface object(s) and/or the pointing object 128 by the user 130 in the activity object 116 may be incrementally presented in the virtual scene 112 as the user 130 manipulates the tangible interface object(s) and/or the pointing object 128. Non-limiting examples of the activity applications 214 may include video games, learning applications, assistive applications, storyboard applications, collaborative applications, productivity applications, etc.

The camera driver 306 includes software storable in the memory 314 and operable by the processor 312 to control/operate the camera 110. For example, the camera driver 306 is a software driver executable by the processor 312 for signaling the camera 110 to capture and provide a video stream and/or still image, etc. The camera driver 306 is capable of controlling various features of the camera 110 (e.g., flash, aperture, exposure, focal length, etc.). The camera driver 306 may be communicatively coupled to the camera 110 and the other components of the computing device 104 via the bus 308, and these components may interface with the camera driver 306 via the bus 308 to capture video and/or still images using the camera 110.

As discussed elsewhere herein, the camera 110 is a video capture device configured to capture video of at least the activity surface 102. The camera 110 may be coupled to the bus 308 for communication and interaction with the other elements of the computing device 104. The camera 110 may include a lens for gathering and focusing light, a photo sensor including pixel regions for capturing the focused light and a processor for generating image data based on signals provided by the pixel regions. The photo sensor may be any type of photo sensor including a charge-coupled device (CCD), a complementary metal-oxide-semiconductor (CMOS) sensor, a hybrid CCD/CMOS device, etc. The camera 110 may also include any conventional features such as a flash, a zoom lens, etc. The camera 110 may include a microphone (not shown) for capturing sound or may be coupled to a microphone included in another component of the computing device 104 and/or coupled directly to the bus 308. In some implementations, the processor of the camera 110 may be coupled via the bus 308 to store video and/or still image data in the memory 314 and/or provide the video and/or still image data to other elements of the computing device 104, such as the detection engine 212 and/or activity application(s) 214.

The storage 310 is an information source for storing and providing access to stored data, such as a database of routines, collection of keypoints, identities of objects and/or graphical elements 120, gallery(ies) of routines and/or animations that may be displayed on the display 320, user profile information, community developed routines and/or graphical elements, virtual enhancements, etc., object data, calibration data, and/or any other information generated, stored, and/or retrieved by the activity application(s) 214.

In some implementations, the storage 310 may be included in the memory 314 or another storage device coupled to the bus 308. In some implementations, the storage 310 may be or included in a distributed data store, such as a cloud-based computing and/or data storage system. In some implementations, the storage 310 may include a database management system (DBMS). For example, the DBMS could be a structured query language (SQL) DBMS. For instance, storage 310 may store data in an object-based data store or multi-dimensional tables comprised of rows and columns, and may manipulate, i.e., insert, query, update, and/or delete, data entries stored in the verification data store using programmatic operations (e.g., SQL queries and statements or a similar database manipulation library). Additional characteristics, structure, acts, and functionality of the storage 310 is discussed elsewhere herein.

Figure 4:
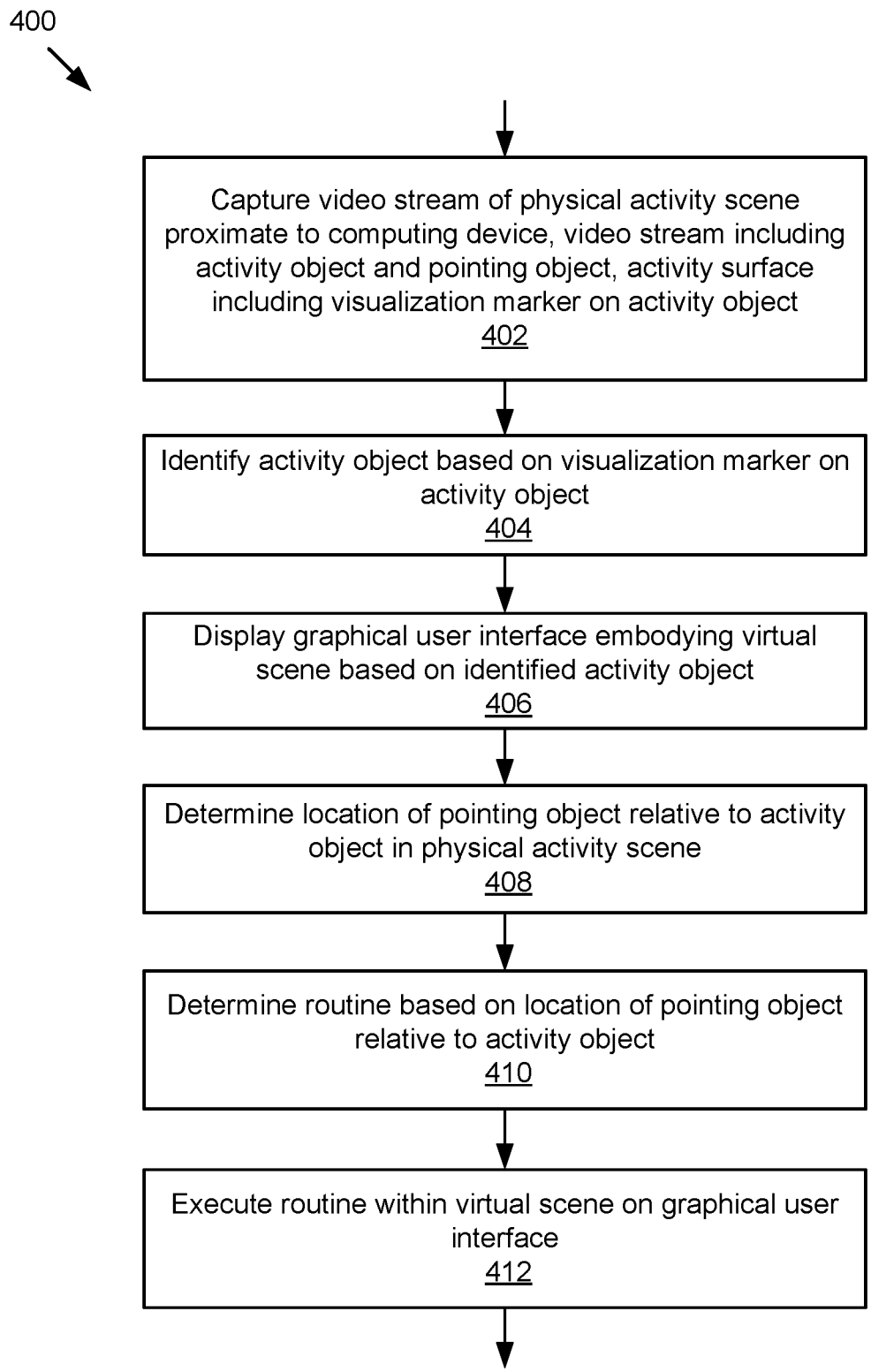
FIG. 4 is a flowchart of an example method for detection of a physical object and activity object.

FIG. 4 is a flowchart of an example method 400 for detection of the pointing object 128 and activity object 116. At 402, the video capture device 110 captures a video stream of a physical activity scene proximate to the computing device 104. The video stream including the activity object 116 on the physical activity surface and the pointing object 128. The video stream including a visualization marker 118 on the activity object that is capable of being detected by a detector 304. In some implementations, the video stream may also include a pointing marker 136 on the pointing object 128, the pointing marker 136 capable of being detected by the detector 304.

At 404, the detector 304 may identify the activity object 116 based on the visualization marker 118 on the activity object 116. In some implementations, the visualization marker 118 may be a graphical element 120 detectable by the detector 304. In some implementation, the visualization marker 118 may be a border around at least a portion of the activity object 116 and may be detectable by the detector 304, such as by contrasting colors between the visualization marker 118 and surrounding areas, etc. In some implementations, the detector 304 may identify a type of activity object 116, the type of the activity object 116 determining the type of activity and/or prompts displayed in the virtual scene 112.

At 406, the activity application(s) 214 displays on the display 320 of the computing device 104 a graphical user interface embodying a virtual scene 112 based on the identified activity object. In some implementations, the virtual scene 112 may include a virtualization of one or more detected tangible interface object(s) and/or a virtual character 126 based on the type of game based on the type of activity object 116. For example, if the activity object 116 represents a representation Paris, then the virtual scene 112 may include one or more prompts 134 to find graphical elements 120 in the activity object 116 and/or a virtual scene 112 configured for the activity object 116 that represents the representation of Paris.

At 408, the detector 304 may determine a location of the pointing object 128 relative to the activity object 116 in the physical activity scene. In some implementations, the location of the pointing object 128 may be determined by identifying the pointing marker 136 and comparing the location of the pointing marker 136 relative to a virtual grid that includes one or more keypoints (such as the graphical elements 120 in some implementations). The detector may determine a position and/or orientation of the activity object 116 and then map the location of the pointing marker 136 to the determined location of the position and/or orientation of the activity object 116. In some implementations, the detector 304 may identify the location of the pointing marker 136 relative to a graphical element 120 (or other keypoints) and whether the pointing marker 136 is pointing to a graphical element 120 that was represented as an objective in a prompt 134 on the virtual scene 112.

At 410, the activity application(s) 214 may determine a routine to display in the virtual scene 112 based on the location of the pointing object 128 relative to the activity object 116. In some implementations, responsive to determining that the pointing object 128 is substantially similar to a location of a point on the activity object 116 that represents the graphical element 120 represented as the objective of the prompt 134, determining that an interaction routine may be executed. An interaction routine may include providing positive feedback in the virtual scene 112 that the user 130 found the correct objective. The interaction routine may also cause the virtual scene 112 to move onto a new prompt 134 that displays a new object for the user 130 to find in the activity object 116. In some implementations, responsive to determining that the pointing object 128 is different than the location of the point on the activity object 116 that represents the graphical element 120 represented as the objective of the prompt 134, determining that an assistive routine may be executed. In some implementations, the assistive routine may cause the virtual scene 112 to provide feedback to the user 130 to continue looking for the correct graphical element 120. In some implementations, the assistive routine may cause one or more hints to be presented for selection by the user 130 or the hints may automatically be displayed, such as responsive to an expiration of a timer, or a detection of a threshold of incorrect locations of the pointing marker 136. In some implementations, the virtual scene may include a processing routine that causes the user 130 to wait for the location of the pointing object 128 to be processed. For example, the processing routine may cause a graphical representation to be displayed that indicates for the user to hold the pointing object 128 still, such as filing up a circle over a period of time, such as a few seconds. This processing routine may allow the user to indicate they are making a selection by pausing and letting the processing routine execute, rather than having the user automatically receive feedback on if the location was correct or incorrect, e.g., whether the location satisfies the selection threshold distance.

At 412, the activity application(s) 214 may execute the determined routine within the virtual scene 112 on the graphical user interface. Executing the determined routine may cause the display 302 to display animations and or advance through a game as the correct routines and/or incorrect routines are presented. In some implementations, executing the routine may cause additional outputs at the computing device 104, such as sounds, etc. and may further cause the virtual scene 112 to advance through the game and display a subsequent prompt 134 to the user 130.

Figure 5:
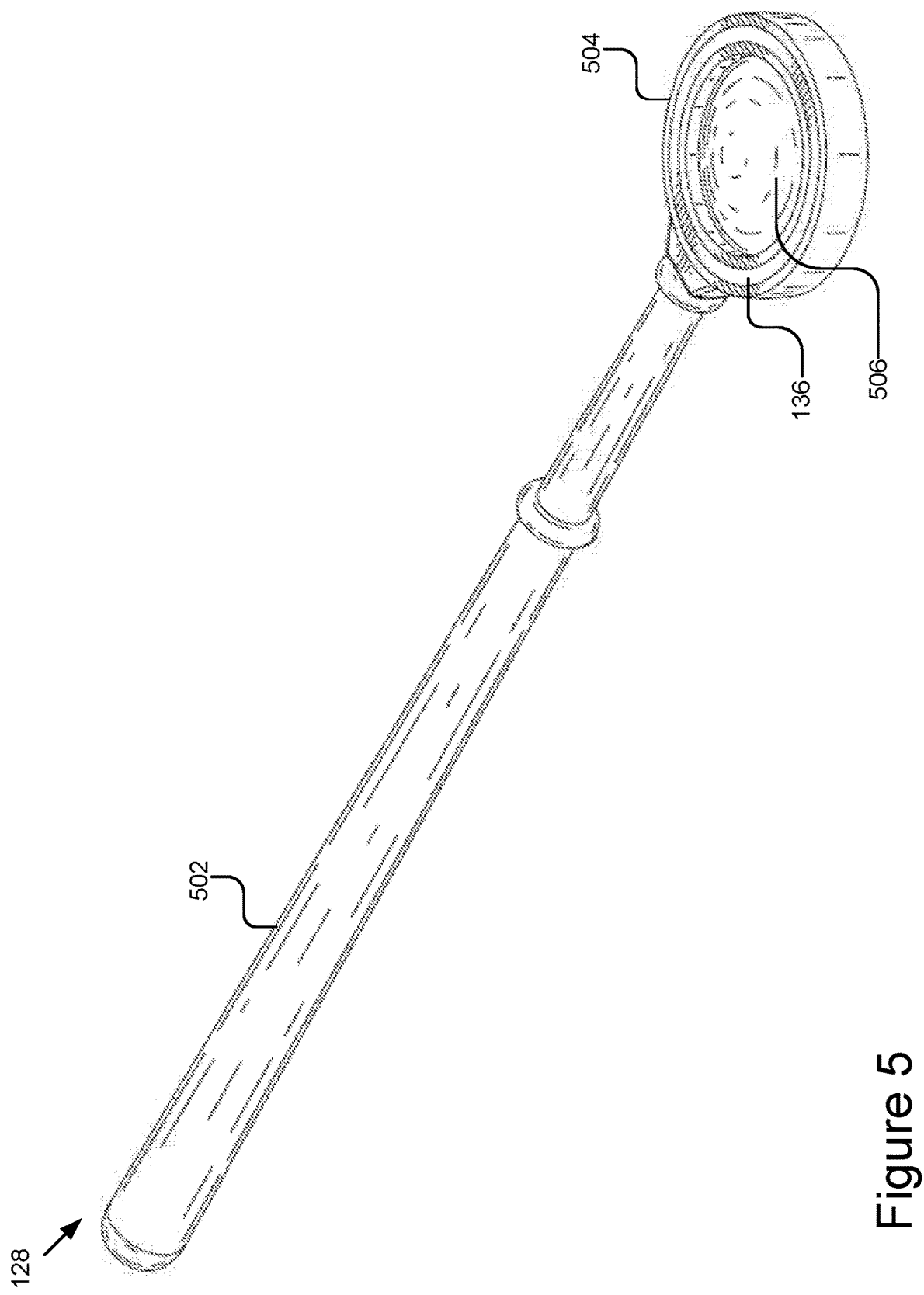
FIG. 5 is an example configuration of a pointing object.

FIG. 5 is an example configuration of the pointing object 128. In the example, the pointing object 128 includes a handle 502, an end 504, a pointing marker 136, and a focus point 506. It should be understood that this is one specific example of a pointing object 128 and other variations of pointing objects are contemplated. In the example configuration, the pointing object represents a magnifying glass and a user 130 may use the magnifying glass with a detective game to provide an immersive experience into the game. The handle 502 may be configured for a user to hold the handle 502 and may be specifically designed in some examples for younger users, such as children. The end 504 may be the portion of the pointing object 128 that is used to point to graphical elements 120 on the activity object. In the example, the end represents the glass portion of a magnifying glass. The end 504 includes the pointing marker 136 represented as a ring in this example. As described elsewhere herein, the pointing marker 136 may be a contrasting color to the surrounding portions of the end 504. In further implementations, the pointing marker 136 may be formed out of projections or other surfaces, such as bumps, hash marks, reflective markings, etc. that may be detected by the detector 304. In some implementations, the pointing markers 136 may be visible to the user 130, while in further implementations, the pointing markers 136 may be unobtrusive and detectable using the detector 304 to process an image of the pointing object 128. In some implementations, the focus point 506, may be a portion of the pointing object 128 that the user 130 may use as a reference for where the pointing object 128 is pointing. In the example, the focus point 506 is the clear portion of the magnifying glass and a user may place the focus point 506 over the graphical element 120 in order to point to the graphical element 120. The detector 304 may reconcile any difference between the location of the focus point 506 relative to the location of the pointing marker 136, such as in this case, where the focus point is in the center between edges of the pointing marker 136. In some implementations, the virtual scene 112 may guide the user to the boundaries of the field of view of the video capture device 110, such as by displaying a visualization of a portion of the activity object 116 (such as a top of the activity object 116) on a portion of the virtual scene 112. As the activity object 116 may be moved through the field of view, the visualization may be updated to indicate the portion of the activity object 116 that is included within the field of view of the video capture device 110.

Other designs of pointing objects 128 are also contemplated, such as objects that allow for immersiveness into a game, such as a baseball bat for a baseball game, a hockey stick for a hockey game, a sword for a castle game, a net or fishing pool for a fishing game. Any object may be used as a pointing object 128, and the pointing object 128 may follow a theme of a game to add to the experience of the user 130. In some implementations, common objects, such as a pen or pencil may be used as a pointing object 128 and the detector 304 may be configured to identify in real time a pointing marker 136 present on the object for use as a pointing object 128. In some implementations, the pointing object 128 may be identified as a type of pointing object 128 and based on the type of pointing object 128, the virtual scene 112 may display a prompt to place a specific activity object 116 in the physical activity scene that is associated with the type of pointing object 128. In some implementations, the pointing object may not be held by a user 130, but may instead be placed, created, etc. on the activity object 116. For example, the pointing object may be a token and the user 130 may place the token on the activity object 116 in such a way that the token obscures or covers up the graphical element 120. The detector 304 may determine the location of the token using markings on the token and may determine if the token is located at a substantially similar location of a graphical element 120, allowing a user to cover up a graphical element 120, rather than pointing to the graphical element 120.

Figure 6:
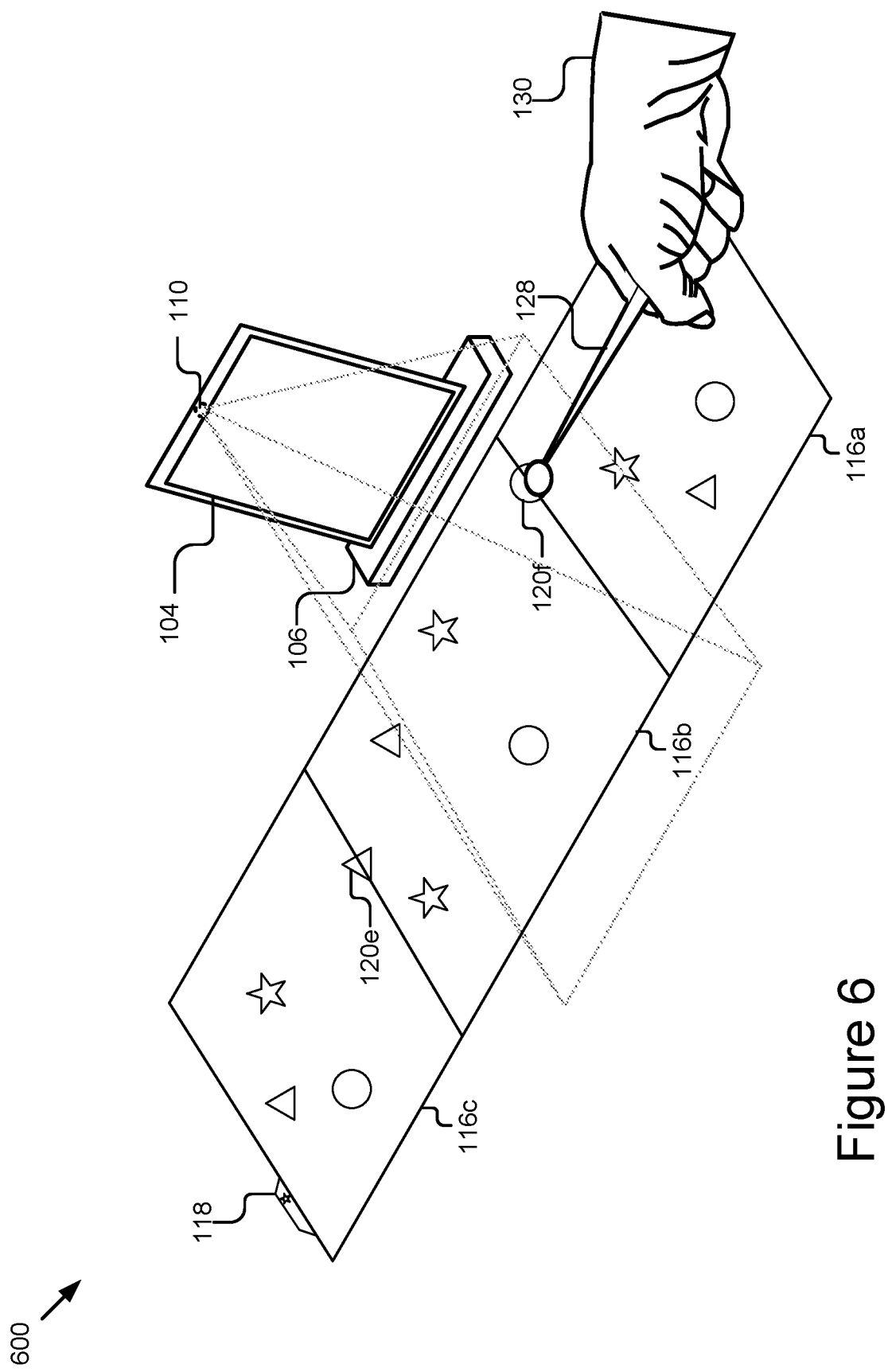
FIG. 6 is an example configuration of an activity object and visualization system.

FIG. 6 is an example configuration 600 of an activity object 116 and visualization system including a computing device 104. In the example configuration 600, the activity object 116 may extend beyond the field of view (shown in broken lines) of the video capture device 110. In the example, the activity object 116 includes three different sections and in some implementations, the activity object 116 may be separable components at the three different sections, or in further implementations, the activity object 116 may fold up to a smaller size to increase the ease of portability and/or storage. In some implementations, the activity object 116 may be movable, such as by a user 130. For example, if a user received a prompt 134 to find graphical element 120e, which is not included within the field of view of the video capture device 110 in the example, the user 130 may need to slide, or otherwise move, the activity object 116 to the right until the graphical element 120e is within the field of view of the video capture device 110. Since the activity object 116 is moveable in these examples, the detector 304 can determine the position and/or orientation of the activity object 116 after the activity object is moved and update the mapping of the graphical elements based on a movement of the activity object 116.

Figure 7A:
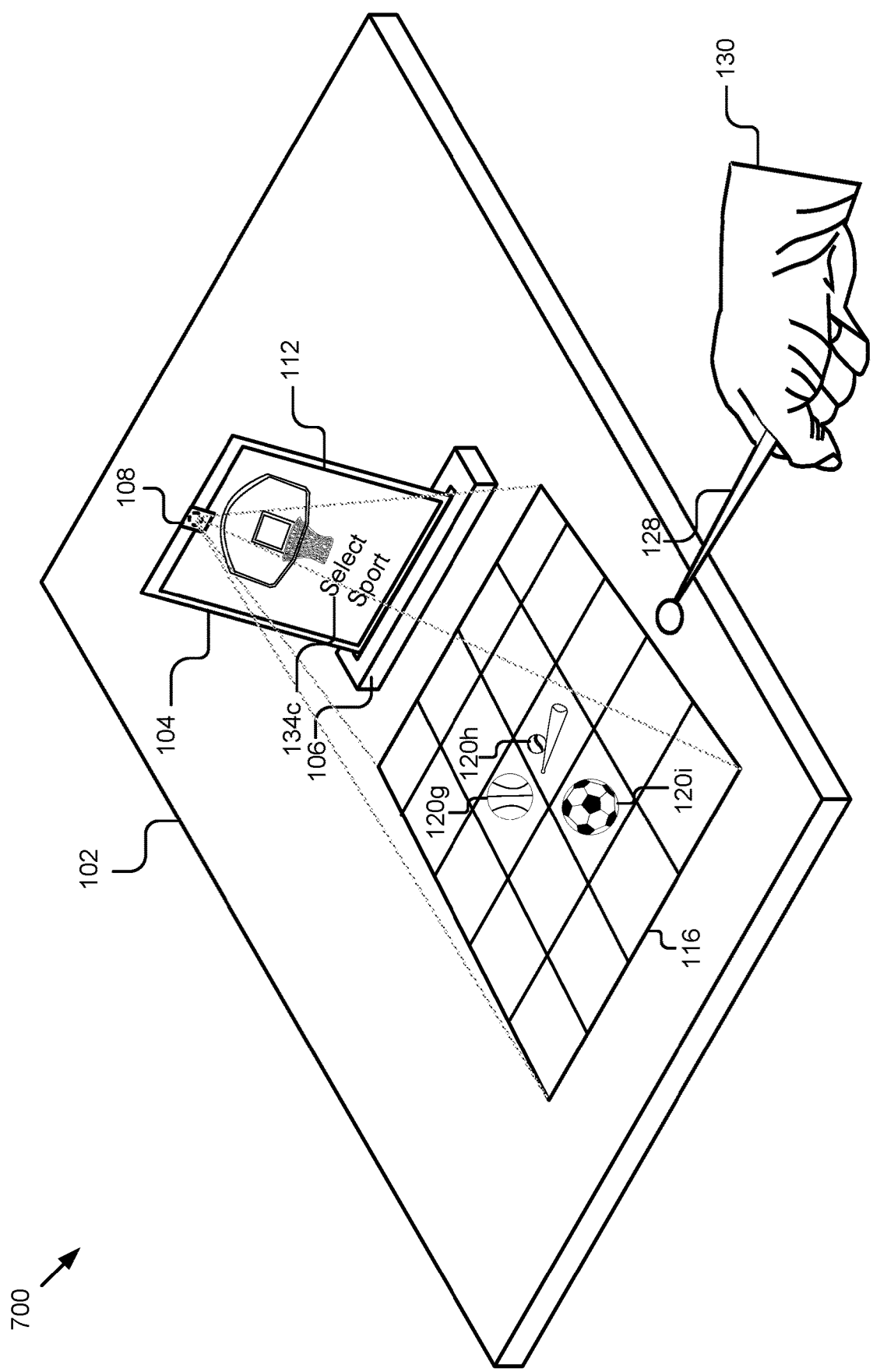
FIGS. 7A and 7B are example configurations illustrating an example physical activity scene and detection of a physical object and activity object.
Figure 7B:
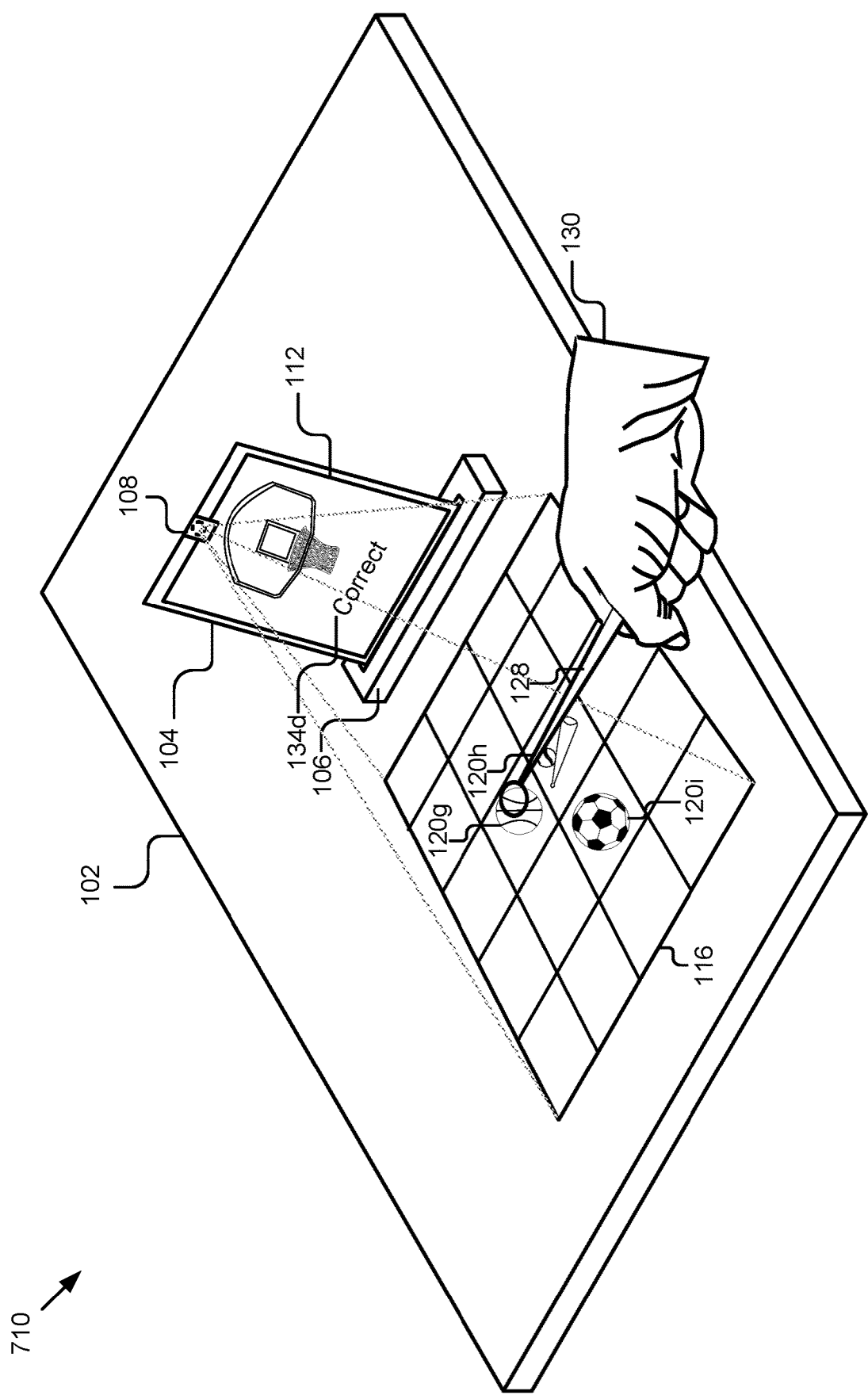

FIGS. 7A and 7B example configurations illustrating detection of the activity object 116 and the pointing object 128. FIG. 7A depicts an example configuration 700 depicting the activity object 116 that has been broken up into grid sections. In some implementations the grid sections may be visible to a user 130 on the activity object 116. In further implementations, the grid sections may be created by the detector 304 in software to identify different areas of the activity object 116. In these implementations, visual cues on the stand 106 and/or adapter 108 and calibration techniques described elsewhere herein may be used to create consistent grid sections in software that may be consistent over multiple uses and different setup configurations. In further implementations, the detector 304 may continually update the grid sections virtually based on movement and changes in the location of the activity object 116 as described elsewhere herein.

In some implementations, the activity application(s) 214 may use the grid sections during various activities. For example, as shown in FIG. 7A, the activity object 116 includes graphical elements 120g, 120h, and 120i representing a basketball, baseball, and soccer ball respectively. A virtualization may be displayed in the virtual scene 112 along with a virtual prompt 134c for a user to "select a sport" based on the virtualization of the basketball hoop. A user 130 may then use the pointing object 128 to search for the graphical element 120g that responds to the virtual prompt 134.

FIG. 7B depicts an example configuration 710 depicting the activity object 116 that has been broken up into grid sections and a user 130 using a pointing object 128 to respond to the virtual prompt 134c from FIG. 7A. The activity application(s) 214 may wait for an indication from the detector 304 that the pointing object 128 is pointing to the grid section that includes the appropriate graphical element 120g, as depicted by the basketball in the example. In response to the detector 304 detecting that the tip of the wand is pointing to the appropriate grid section, the activity application(s) 214 may update/display the virtual prompt 134d to signal to the user 130 the appropriateness of the interaction, such as displaying a "correct" message in the virtual scene 112.

In further implementations, the activity application(s) 214 may use the grid sections to run a search game. In some examples, the search game may include an activity object 116 that is full of different graphical elements 120, such as a page from a book, a created drawing, a random arrangement of physical objects, a virtual display on a second display screen, etc. The detector 304 may identify a specific graphical element 120 present in the activity object 116 and the activity application(s) 214 may display a visual prompt 134 to signal to the user 130 to interact with the specific graphical element 120 in the activity object 116. The user 130 may then use the pointing object 128 to point and/or interact with the specific graphical element 120.

In a specific example, a page depicting a scene with different graphical elements 120 may be the activity object 116. The detector 304 may identify visual cues on the page and identify a type of the page. The activity application(s) 214 may use the visual cues to retrieve a virtual prompt 134 related to one or more graphical elements 120 within the scene. The user 130 may then search for the graphical elements 120 associated with the virtual prompt 134 and when the user 130 identifies the graphical elements 120 within the page, the user 130 may place the pointing object 128 over and/or proximate to the graphical elements 120 to signal to the activity application(s) 214 that the graphical elements 120 have been found.

In some implementations, the end of the pointing object 128 may include a hollowed out or clear circle, or other shape, and the detection engine 212 may determine if at least a portion of the graphical element 120 associated with the virtual prompt 134 is visible within the hollowed out portion in order to determine if the graphical element 120 has been identified. In further implementations, the detection engine 212 may provide the location of the tip of the pointing object 128 as grid sections based on the location of the tip of the pointing object 128. The activity application(s) 214 may compare the grid section of the location of the tip of the pointing object 128 to stored grid sections that represent the location of the graphical element 120 associated with the virtual prompt 134 in order to determine if the graphical element 120 has been found and/or identified. In further implementations, the grid sections may be used to perform various actions and games, such as keeping track of how many graphical elements 120 and/or objects are found within a period of time, tracking the movement of the tip of the pointing object 128 such as through a maze, identifying two different pointing objects 128 from different users 130 and keeping track of each pointing object 128 location separately, etc.

Figure 8:
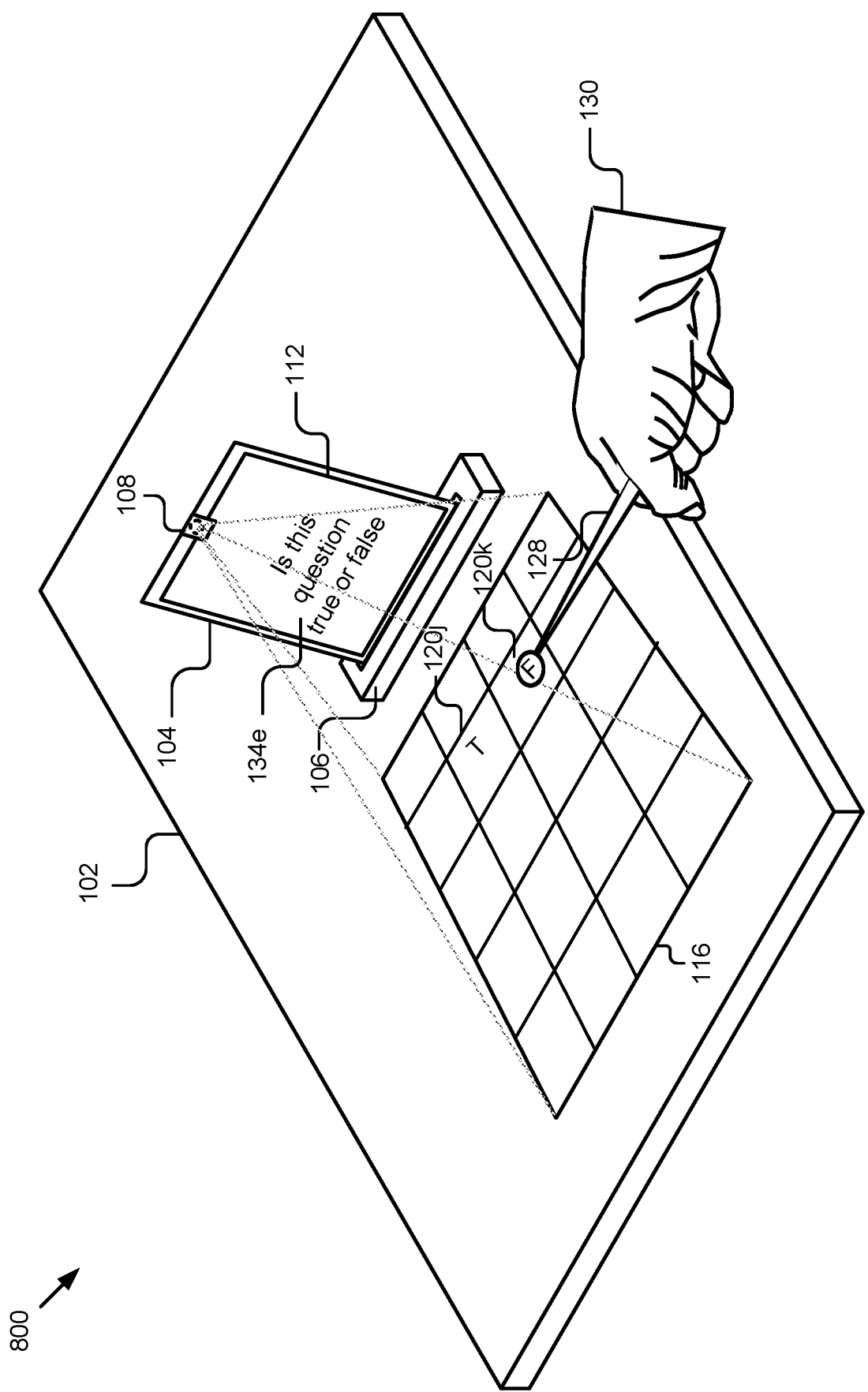
FIG. 8 is another example configuration for detection of a physical object and activity object.

FIG. 8 depicts an example configuration 800 depicting the activity object 116 that has been broken up into grid sections and a user 130 using a pointing object 128 to respond to the prompt 134e. In the example, the prompt 134e may display a question or a prompt to the user 130. The user 130 in response to the prompt may select an answer represented graphical elements 120j and 120k. In some implementations, the answers may be true and false answers, multiple choice answers selected from a page or list on the activity object 116, a written answer created by the user 130, an arrangement of objects such as to spell a word or letter, etc. In some implementations, the user 130 may select an answer by pointing the pointing object 128 at the tangible interface object(s) 120 representing the user's 130 response. Such as by selecting "False" in the example in FIG. 8 by pointing to graphical element 120k. In some implementations, the detection engine 212 may determine which answer is being selected based on the location of the pointing object 128 in the grid sections and may map that location to a map of answers based on the grid sections that are mapped out and stored in storage 310.

In some implementations, the user 130 may select an answer in response to a prompt separate from the virtual prompt 134e displayed in the virtual scene. For example, a teacher may ask a class of students a question and each student may use a separate computing device 104 and activity object 116 to answer the question on their individual computing device 104. The separate computing devices 104 may record each students answer and/or provide feedback based on the students selection. By instructing a whole class and allowing each student to answer, the example allows for a teacher to engage more with the students and each student is able to individually respond and receive direct feedback without requiring the teacher to intervene. This system reduces the time required for the teacher to focus on certain students and improves the opportunities for learning in the classroom. In further implementations, this same process could be done remotely with students that are at separate locations and the teacher may be able to observe each students answers as detected by the individual students computing devices 104.

Figure 9:
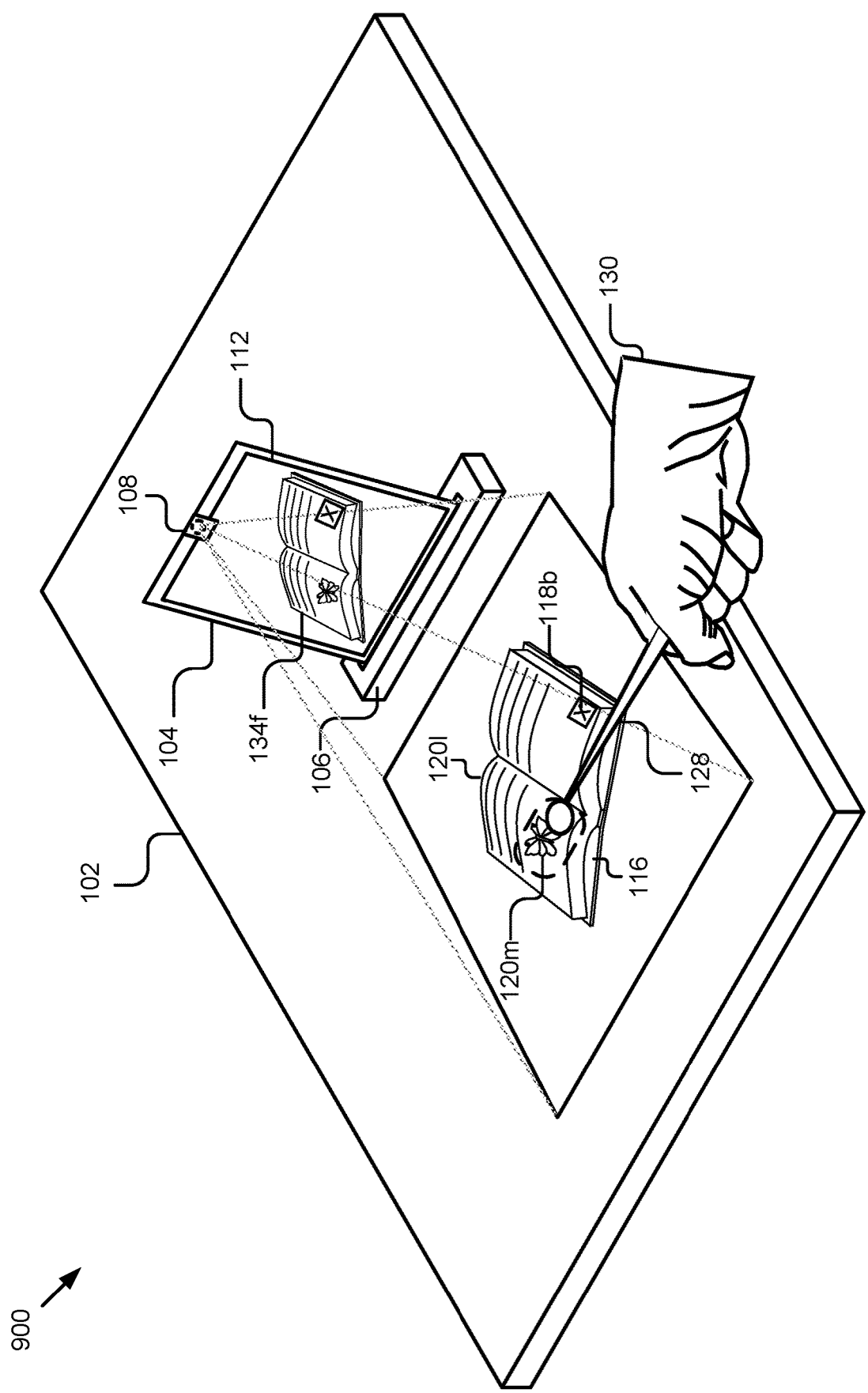
FIG. 9 is another example configuration for detection of a physical object and activity object.

FIG. 9 is an example configuration 900 illustrating an example activity object 116 that is a book. In some implementations, the activity object 116 representing the book may include one or more visualization markings 118 and/or graphical elements 120l that may be used by the detection engine 212 to identify the page of the book and/or determine an orientation of the book. The visualization markings 118 and/or graphical elements 120l may be used to perform page tracking by the detection engine 212. The page tracking may allow the detection engine 212 to identify the contents of the book and display one or more prompts 134f related to the page of the book in the virtual scene 112. In some implementations, the page tracking may correct any keystoning and/or orientation deviations introduced by the book being askew based on the detected visualization markings 118 and/or graphical elements 120l. In further implementations, the detection engine 212 may identify the visualization markings 118 and/or graphical elements 120l and the activity application(s) 214 may retrieve a virtualization and/or a prompt 134f from storage 310 based on the visualization markings 118 and/or graphical elements 120l. In some implementations, the detection engine 212 may search for the visualization markings 118 and/or graphical elements 120l before the prompt 134f is displayed in the virtual scene 112 and if the visualization markings 118 and/or graphical elements 120*l* are not detected, then the activity application(s) 214 may not execute applications in the virtual scene 112.

In some implementations, a user 130 may use the pointing object 128 to interact with one or more objects and/or graphical elements 120*l* present within a page of the book as shown in FIG. 9. The detection engine 212 may track the location of the pointing object 128 and cause the activity application(s) 214 to execute routines within the virtual scene 112 based on the location of the pointing object 128. In some implementations, the location of the pointing object 128 may include a gesture of the pointing object 128 that is detectable by the detection engine 212. For example, a user 130 may loop the pointing object 128 in the circle and/or add audio cues, such as "abra-kadabra" that the detection engine 212 may detect from the video stream. In response to the gesture of the pointing object 128, the activity application(s) 214 may cause the virtual scene 112 to execute a virtual response, such as causing a virtual character 126 (not shown) to perform a virtual action, etc.

This technology yields numerous advantages including, but not limited to, providing a low-cost alternative for developing a nearly limitless range of applications that blend both physical and digital mediums by reusing existing hardware (e.g., camera) and leveraging novel lightweight detection and recognition algorithms, having low implementation costs, being compatible with existing computing device hardware, operating in real-time to provide for a rich, real-time virtual experience, processing numerous (e.g., >15, >25, >35, etc.) tangible interface object(s) 120 and/or an interaction simultaneously without overwhelming the computing device, objects, graphical elements 120, and/or the pointing object 128 interacting with the activity object 116, with substantially perfect recall and precision (e.g., 99% and 99.5%, respectively), being capable of adapting to lighting changes and wear and imperfections in the detections, providing a collaborative tangible experience between users in disparate locations, being intuitive to setup and use even for young users (e.g., 3+ years old), being natural and intuitive to use, and requiring few or no constraints on the types of objects that can be processed.

It should be understood that the above-described example activities are provided by way of illustration and not limitation and that numerous additional use cases are contemplated and encompassed by the present disclosure. In the above description, for purposes of explanation, numerous specific details are set forth in order to provide a thorough understanding of the present disclosure. However, it should be understood that the technology described herein may be practiced without these specific details. Further, various systems, devices, and structures are shown in block diagram form in order to avoid obscuring the description. For instance, various implementations are described as having particular hardware, software, and user interfaces. However, the present disclosure applies to any type of computing device that can receive data and commands, and to any peripheral devices providing services.

In some instances, various implementations may be presented herein in terms of algorithms and symbolic representations of operations on data bits within a computer memory. An algorithm is here, and generally, conceived to be a self-consistent set of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout this disclosure, discussions utilizing terms including "processing," "computing," "calculating," "determining," "displaying," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Various implementations described herein may relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, including, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

The technology described herein can take the form of a hardware implementation, a software implementation, or implementations containing both hardware and software elements. For instance, the technology may be implemented in software, which includes but is not limited to firmware, resident software, microcode, etc. Furthermore, the technology can take the form of a computer program product accessible from a computer-usable or computer-readable medium providing program code for use by or in connection with a computer or any instruction execution system. For the purposes of this description, a computer-usable or computer readable medium can be any non-transitory storage apparatus that can contain, store, communicate, propagate, or transport the program for use by or in connection with the instruction execution system, apparatus, or device.

A data processing system suitable for storing and/or executing program code may include at least one processor coupled directly or indirectly to memory elements through a system bus. The memory elements can include local memory employed during actual execution of the program code, bulk storage, and cache memories that provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems, storage devices, remote printers, etc., through intervening private and/or public networks. Wireless (e.g., Wi-Fi™) transceivers, Ethernet adapters, and modems, are just a few examples of network adapters. The private and public networks may have any number of configurations and/or topologies. Data may be transmitted between these devices via the networks using a variety of different communication protocols including, for example, various Internet layer, transport layer, or application layer protocols. For example, data may be transmitted via the networks using transmission control protocol/Internet protocol (TCP/IP), user datagram protocol (UDP), transmission control protocol (TCP), hypertext transfer protocol (HTTP), secure hypertext transfer protocol (HTTPS), dynamic adaptive streaming over HTTP (DASH), real-time streaming protocol (RTSP), real-time transport protocol (RTP) and the real-time transport control protocol (RTCP), voice over Internet protocol (VOIP), file transfer protocol (FTP), WebSocket (WS), wireless access protocol (WAP), various messaging protocols (SMS, MMS, XMS, IMAP, SMTP, POP, WebDAV, etc.), or other known protocols.

Finally, the structure, algorithms, and/or interfaces presented herein are not inherently related to any particular computer or other apparatus. Various general-purpose systems may be used with programs in accordance with the teachings herein, or it may prove convenient to construct more specialized apparatus to perform the required method blocks. The required structure for a variety of these systems will appear from the description above. In addition, the specification is not described with reference to any particular programming language. It will be appreciated that a variety of programming languages may be used to implement the teachings of the specification as described herein.

The foregoing description has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies and other aspects are not mandatory or significant, and the mechanisms that implement the specification or its features may have different names, divisions and/or formats.

Furthermore, the modules, routines, features, attributes, methodologies and other aspects of the disclosure can be implemented as software, hardware, firmware, or any combination of the foregoing. Also, wherever an element, an example of which is a module, of the specification is implemented as software, the element can be implemented as a standalone program, as part of a larger program, as a plurality of separate programs, as a statically or dynamically linked library, as a kernel loadable module, as a device driver, and/or in every and any other way known now or in the future. Additionally, the disclosure is in no way limited to implementation in any specific programming language, or for any specific operating system or environment. Accordingly, the disclosure is intended to be illustrative, but not limiting, of the scope of the subject matter set forth in the following claims.

What is claimed is:

1. A method comprising: capturing, using a video capture device coupled to a computing device, a video stream of a physical activity scene proximate to the computing device, the video stream including an activity object and a pointing object, the activity object including a visualization marker on the activity object; identifying, using a processor of the computing device, the activity object based on the visualization marker on the activity object; displaying, on a display of the computing device, a graphical user interface embodying a virtual scene based on the identified activity object; mapping, using the processor of the computing device, a location of the pointing object and a location of the activity object in a virtual grid using the visualization marker; determining, using the processor of the computing device, a location of the pointing object relative to the activity object in the physical activity scene based on the mapping; determining, using the processor of the computing device, a routine based on the location of the pointing object relative to the activity object; and executing, on the display of the computing device, the routine within the virtual scene on the graphical user interface.

2. The method of claim 1, wherein the virtual scene includes a prompt, the prompt representing a point on the activity object.

3. The method of claim 2, wherein determining the routine based on the location of the pointing object relative to the activity object, further comprises:
   determining, using the processor of the computing device, a distance between the location of the pointing object relative to a location of the point on the activity object; and
   responsive to determining the distance satisfies a selection threshold, executing an interaction routine within the virtual scene on the graphical user interface.

4. The method of claim 3, further comprising:
   responsive to determining that the distance does not satisfy the selection threshold, executing an assistive routine within the virtual scene on the graphical user interface.

5. The method of claim 1, wherein the visualization marker includes a detectable graphic incorporated into the activity object, the detectable graphic being detectable by the processor of the computing device.

6. The method of claim 1, wherein the pointing object includes a pointing marker, the pointing marker being detectable by the processor of the computing device to determine the location of the pointing object relative to the activity object.

7. The method of claim 1, wherein the video capture device includes a field of view that encompasses a portion of the physical activity scene and wherein the activity object extends beyond the field of view of the video capture device.

8. The method of claim 7, wherein the activity object is movable to allow different portions of the activity object to appear within the field of view of the video capture device.

9. The method of claim 8, further comprising:
   detecting, using the processor of the computing device, a movement of the activity object; and
   determining, using the processor of the computing device, an updated location of the pointing object relative to the movement of the activity object.

10. The method of claim 1, wherein determining the location of the pointing object relative to the activity object in the physical activity scene based on the mapping further comprises:
    mapping, using the processor of the computing device, the location of the pointing object to a first grid section of the virtual grid and the location of the activity object to a second grid section of the virtual grid;
    determining, using the processor of the computing device, that the first grid section and the second grid section are adjacent grid sections of the virtual grid; and
    determining, using the processor of the computing device, that the location of the pointing object is substantially similar to the location of the activity object based on the first grid section and the second grid section being adjacent grid sections of the virtual grid.

11. A physical activity scene visualization system comprising: a video capture device coupled for communication with a computing device, the video capture device being adapted to capture a video stream that includes an activity object and a pointing object, the activity object including a visualization marker on the activity object; a detector coupled to the computing device, the detector being adapted to identify within the video stream the activity object and a location of the pointing object relative to the activity object; a processor of the computing device, the processor being adapted to map the location of the pointing object and a location of the activity object on a virtual grid using the visualization marker, and determine a routine based on the mapping of the location of the pointing object relative to the location of the activity object; and a display coupled to the computing device, the display being adapted to display a graphical user interface that includes a virtual scene and the routine.

12. The physical activity scene visualization system of claim 11, wherein the virtual scene includes a prompt, the prompt representing a point on the activity object.

13. The physical activity scene visualization system of claim 12, wherein the processor that is adapted to determine the routine, is further configured to:
determine a distance between the location of the pointing object relative to a location of the point on the activity object; and
responsive to determining the distance satisfies a selection threshold, executing on the display, an interaction routine within the virtual scene on the graphical user interface.

14. The physical activity scene visualization system of claim 13, wherein the processor that is adapted to determine the routine, is further configured to:
responsive to determining that the distance does not satisfy the selection threshold, executing an assistive routine within the virtual scene on the graphical user interface.

15. The physical activity scene visualization system of claim 11, wherein the activity object further includes a visualization marker detectable by the detector, the visualization marker including a graphic incorporated into the activity object.

16. The physical activity scene visualization system of claim 11, wherein the pointing object includes a pointing marker, the pointing marker being detectable by the detector to determine the location of the pointing object relative to the activity object.

17. The physical activity scene visualization system of claim 11, wherein the video capture device includes a field of view that encompasses a portion of physical activity scene and wherein the activity object extends beyond the field of view of the video capture device.

18. The physical activity scene visualization system of claim 17, wherein the activity object is movable to allow different portions of the activity object to appear within the field of view of the video capture device.

19. The physical activity scene visualization system of claim 18, wherein the detector is further configured to:
detect a movement of the activity object; and
determine an updated location of the pointing object relative to the movement of the activity object.

20. The physical activity scene visualization system of claim 11, wherein the detector is further configure to: map one or more sections of a physical activity scene into grid sections of the virtual grid; map the location of the pointing object into a first grid section of the virtual grid and the location of the activity object into a second grid section of the virtual grid; determine that the first grid section and the second grid section are adjacent grid sections of the grid sections of the virtual grid; and determine that the location of the pointing object is substantially similar to the location of the activity object based on the first grid section and the second grid section being adjacent grid sections of the virtual grid.

21. A method comprising:
capturing, using a video capture device coupled to a computing device, a video stream of a physical activity scene proximate to the computing device, the video stream including an activity object and a pointing object, the activity object including a visualization marker on the activity object and the pointing object including a pointing marker;
identifying, using a processor of the computing device, a type of the activity object based on the visualization marker on the activity object;
displaying, on a display of the computing device, a graphical user interface embodying a virtual scene based on the identified type of the activity object;
mapping, using the processor of the computing device, a location of the activity object on a virtual grid using the visualization marker on the activity object;
mapping, using the processor of the computing device, a location of the pointing object on the virtual grid using the pointing marker;
determining, using the processor of the computing device, a position and an orientation of the activity object based on the mapping of the location of the activity object;
determining, using the processor of the computing device, the location of the pointing object relative to the position and the orientation of the activity object in the physical activity scene based on the mapping of the location of the pointing object;
determining, using the processor of the computing device, a routine based on the location of the pointing object relative to the position and the orientation of the activity object; and
executing, on the display of the computing device, the routine within the virtual scene on the graphical user interface.

22. The method of claim 21, wherein the activity object includes a graphical element, the virtual scene includes a prompt displaying a representation of the graphical element, and determining the location of the pointing object further comprises:
determining, using the processor of the computing device, the location of the pointing object relative to a location of the graphical element in the activity object.

23. The method of claim 22, further comprising:
determining, using the processor of the computing device, a distance between the location of the pointing object and the location of the graphical element.

* * * * *